(12) United States Patent
Park et al.

(10) Patent No.: US 11,178,568 B2
(45) Date of Patent: Nov. 16, 2021

(54) METHOD FOR UPLINK TRANSMISSION IN WIRELESS LAN SYSTEM AND WIRELESS TERMINAL USING SAME

(71) Applicant: LG ELECTRONICS INC., Seoul (KR)

(72) Inventors: Hyunhee Park, Seoul (KR); Kiseon Ryu, Seoul (KR); Suhwook Kim, Seoul (KR); Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 655 days.

(21) Appl. No.: 16/076,087

(22) PCT Filed: Feb. 17, 2017

(86) PCT No.: PCT/KR2017/001796
§ 371 (c)(1),
(2) Date: Aug. 7, 2018

(87) PCT Pub. No.: WO2017/142357
PCT Pub. Date: Aug. 24, 2017

(65) Prior Publication Data
US 2021/0195460 A1 Jun. 24, 2021

Related U.S. Application Data

(60) Provisional application No. 62/296,108, filed on Feb. 17, 2016, provisional application No. 62/299,012, (Continued)

(51) Int. Cl.
*H04W 28/02* (2009.01)
*H04L 1/16* (2006.01)
*H04W 84/12* (2009.01)

(52) U.S. Cl.
CPC ....... *H04W 28/0268* (2013.01); *H04L 1/1614* (2013.01); *H04W 28/0278* (2013.01); *H04W 84/12* (2013.01)

(58) Field of Classification Search
None
See application file for complete search history.

(56) References Cited

U.S. PATENT DOCUMENTS 9,826,532 B1 * 11/2017 Chu ................. H04W 72/1284
10,306,603 B1 * 5/2019 Chu ................. H04W 72/0406
(Continued)

FOREIGN PATENT DOCUMENTS

| KR | 101569429 | 11/2015 |
|---|---|---|
| WO | 2015190779 | 12/2015 |
| WO | 2015199306 | 12/2015 |

OTHER PUBLICATIONS

PCT International Application No. PCT/KR2017/001796, International Search Report dated May 23, 2017, 4 pages.
(Continued)

*Primary Examiner* — Andre Tacdiran
(74) *Attorney, Agent, or Firm* — Lee, Hong, Degerman, Kang & Waimey

(57) ABSTRACT

A method for uplink multi-user (UL MU) operation in a WLAN system according to an embodiment of the present specification comprises the steps of: receiving, by an access point (AP), a buffer state report frame used for the UL MU operation from a user STA associated with the AP, wherein the buffer state report frame includes bitmap information for a plurality of access categories for which the buffer state of the user STA is to be reported, and identification information for a number of traffic identifiers (TIDs) for at least one traffic being buffered by the user STA, wherein the identifier information is set based on a number of the plurality of access categories indicated by the bitmap information; and
(Continued)

transmitting, by the AP, a trigger frame for triggering the UL MU operation from a plurality of user STAs.

21 Claims, 24 Drawing Sheets

Related U.S. Application Data filed on Feb. 24, 2016, provisional application No. 62/303,394, filed on Mar. 4, 2016, provisional application No. 62/335,605, filed on May 12, 2016, provisional application No. 62/344,404, filed on Jun. 2, 2016.

(56) References Cited

U.S. PATENT DOCUMENTS

| | | | |
|---|---|---|---|
| 2003/0133428 A1* | 7/2003 | Turki | H04W 74/06 370/338 |
| 2005/0025167 A1* | 2/2005 | Ishibashi | H04L 12/56 370/412 |
| 2005/0249227 A1 | 11/2005 | Wang et al. | |
| 2006/0280194 A1* | 12/2006 | Jang | H04L 49/9042 370/412 |
| 2010/0165872 A1* | 7/2010 | Jiang | H04L 49/90 370/253 |
| 2015/0382275 A1 | 12/2015 | Pragada et al. | |
| 2016/0174225 A1* | 6/2016 | Patil | H04W 4/06 370/329 |
| 2016/0323426 A1* | 11/2016 | Hedayat | H04W 28/0268 |
| 2017/0230860 A1* | 8/2017 | Li | H04W 28/0278 |
| 2018/0131471 A1* | 5/2018 | Ahn | H04W 72/1284 |
| 2018/0302194 A1* | 10/2018 | Wang | H04L 1/1864 |
| 2020/0336934 A1* | 10/2020 | Chu | H04W 72/0406 |

OTHER PUBLICATIONS

IEEE Computer Society, "Draft Standard for Information technology—Telecommunications and information exchange between systems Local and metropolitan area networks—Specific requirements", IEEE P802.11ax/D1.0, Nov. 2016, 453 pages.

* cited by examiner

FIG. 1
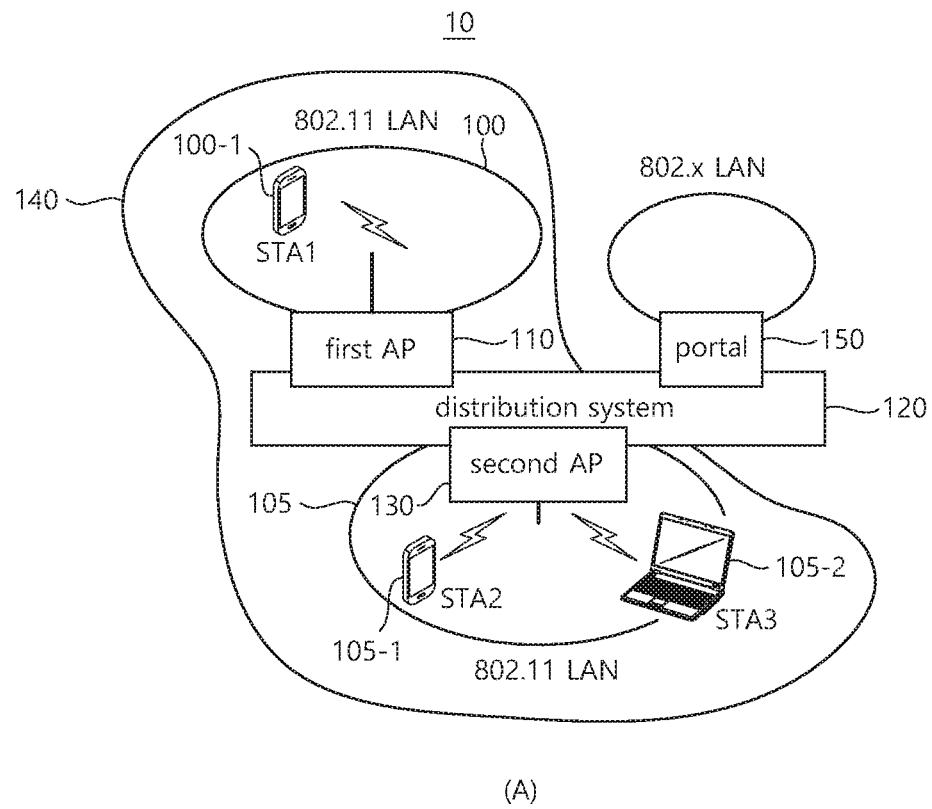
(A)
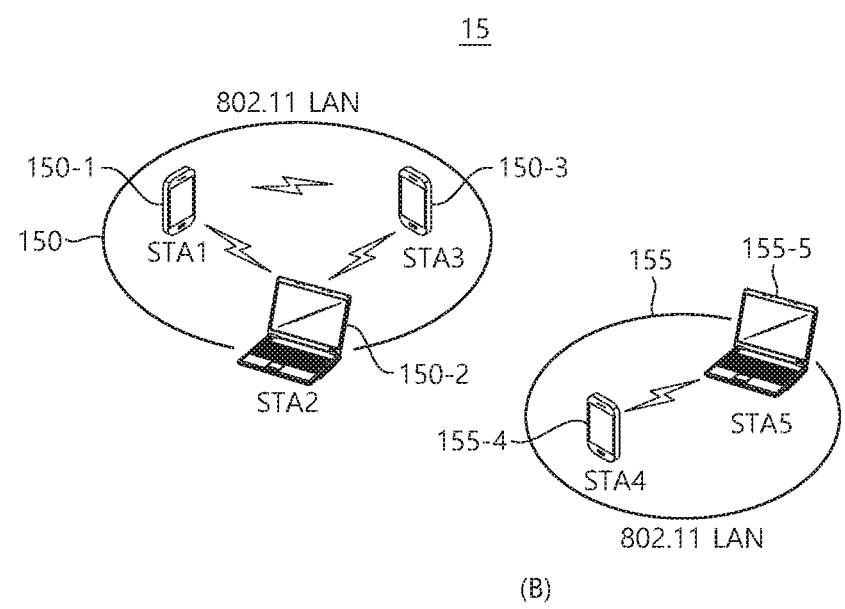
(B)

FIG. 20

| Traffic type (2010) B6-B7 | AC bitmap (2020) B8-B9 | | Scale Factor (2030) B10-B13 | | reserve (2040) B14-B15 | Queue Size (bit 0-15) (2050) B16-B23 | B24-B31 |
|---|---|---|---|---|---|---|---|
| 0 0 | \multicolumn{2}{c|}{rev} | | | | | |
| 0 1 | AC_BE | AC_BK | SF(AC_BE) | SF(AC_BK) | rev | Queue Size (AC_BE) | Queue Size (AC_BK) |
| 1 0 | AC_VO | AC_VI | SF(AC_VO) | SF(AC_VI) | rev | Queue Size (AC_VO) | Queue Size (AC_VI) |
| 1 1 | \multicolumn{2}{c|}{rev} | SF(DS) | SF(DT) | rev | A-Queue Size_DS | A-Queue Size_DT |

FIG. 22

| AC bitmap (2210) | | | | Scale Factor (2220) | | A-indicator (2230) | | Queue Size1 (2240) | Queue Size2 (2250) |
|---|---|---|---|---|---|---|---|---|---|
| B6 AC VO | B7 AC VI | B8 AC BE | B9 AC BK | B10-B11 | B12-B13 | B14 | B15 | B16-B23 | B24-B31 |
| 0 | 0 | 0 | 0 | SF1 | SF2 | 0 | 0 | V1 | V2 |
| 0 | 0 | 0 | 1 | SF1 | SF2 | 0 | 0 | V1 | V2 |
| 0 | 0 | 1 | 0 | SF1 | SF2 | 0 | 0 | V1 | V2 |
| 0 | 1 | 1 | 1 | SF1 | SF2 | 0 | 1 | V1 | V2 |
| 0 | 1 | 0 | 0 | SF1 | SF2 | 0 | 0 | V1 | V2 |
| 0 | 1 | 0 | 1 | SF1 | SF2 | 0 | 0 | V1 | V2 |
| 0 | 1 | 1 | 0 | SF1 | SF2 | 0 | 1 | V1 | V2 |
| 1 | 0 | 0 | 1 | SF1 | SF2 | 0 | 0 | V1 | V2 |
| 1 | 0 | 1 | 0 | SF1 | SF2 | 0 | 0 | V1 | V2 |
| 1 | 1 | 1 | 1 | SF1 | SF2 | 1 | 1 | V1 | V2 |
| 1 | 1 | 0 | 0 | SF1 | SF2 | 1 | 0 | V1 | V2 |
| 1 | 1 | 1 | 1 | SF1 | SF2 | 1 | 1 | V1 | V2 |

FIG. 23

| | Queue size indication (B6-B7) | AC_VO | AC_VI | AC_BE | AC_BK |
|---|---|---|---|---|---|
| 1 | 00 | 1 | 1 | 1 | 0 |
| 2 | 01 | 1 | 1 | 0 | 1 |
| 3 | 10 | 1 | 0 | 1 | 1 |
| 4 | 11 | 0 | 1 | 1 | 1 |

2310

METHOD FOR UPLINK TRANSMISSION IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2017/001796, filed on Feb. 17, 2017, which claims the benefit of U.S. Provisional Application No. 62/296,108, filed on Feb. 17, 2016, 62/299,012, filed on Feb. 24, 2016, 62/303,394, filed on Mar. 4, 2016, 62/335,605, filed on May 12, 2016, and 62/344,404, filed on Jun. 2, 2016, the contents of which are all hereby incorporated by reference herein in their entirety.

BACKGROUND OF THE INVENTION

Field of the Invention

The present invention relates to wireless communication and, most particularly, to a method for an uplink transmission in a wireless LAN system and a wireless terminal using the same.

Related Art

With the recent evolution in the information communication technology, diverse types of wireless communication technology are being developed. Most particularly, the wireless local area network (hereinafter referred to as 'WLAN') corresponds to a technology that allows wireless access to the Internet from general households, companies, or specific service providing areas by using a portable device based on a radio frequency technology.

For example, the portable device may correspond to a personal digital assistant (PDA), a laptop computer, a portable multimedia player (PMP), and so on. Generally, a device-to-device communication of a WLAN system is carried out by passing through a management entity, such as a base station or an access point (AP). The management entity performs scheduling for data communication.

In order to ensure flexibility in the device-to-device communication of the WLAN system, diverse protocols for performing device-to-device communication without passing through the management entity are being proposed. The NAN corresponds to a standard that is being established by the Wi-Fi Alliance (WFA) based on the Wi-Fi standard. The NAN standard regulates synchronization and discovery (or search) processes between the devices in a 2.5 GHz or 5 GHz frequency band.

SUMMARY OF THE INVENTION

Technical Objects

An object of this specification is to provide a method for an uplink transmission in a wireless LAN system having an enhanced performance and a wireless terminal using the same.

Technical Solutions

This specification relates to a method for an uplink multi-user (UL MU) operation in a wireless LAN system. According to an exemplary embodiment of this specification, the method for an uplink transmission in a WLAN system may include the steps of receiving, by an access point (AP), a buffer status report frame used for the UL MU operation from a user station (STA) being associated with the AP, wherein the buffer status report frame includes bitmap information for a plurality of access categories for which a buffer status of the user STA is to be reported, and identifier information for a number of traffic TIDs for at least one traffic being buffered by the user STA, wherein the identifier information is set based on a number of the plurality of access categories indicated by the bitmap information, and transmitting, by the AP, a trigger frame for triggering the UL MU operation from a plurality of user STAs.

Effects of the Invention

According to an exemplary embodiment of this specification, a method for an uplink transmission in a wireless LAN system having an enhanced performance and a wireless terminal using the same is provided.

BRIEF DESCRIPTION OF THE DRAWINGS

FIG. 1 is a conceptual view illustrating the structure of a wireless local area network.

FIG. 20 is a diagram for describing a plurality of sub-fields of a control information field according to another exemplary embodiment of this specification.

FIG. 22 is a diagram for describing a plurality of sub-fields according to yet another exemplary embodiment of this specification.

FIG. 23 is a conceptual diagram for describing a plurality of sub-fields for buffer status report of all access categories according to another exemplary embodiment of this specification.

DESCRIPTION OF EXEMPLARY EMBODIMENTS

Figure 2:
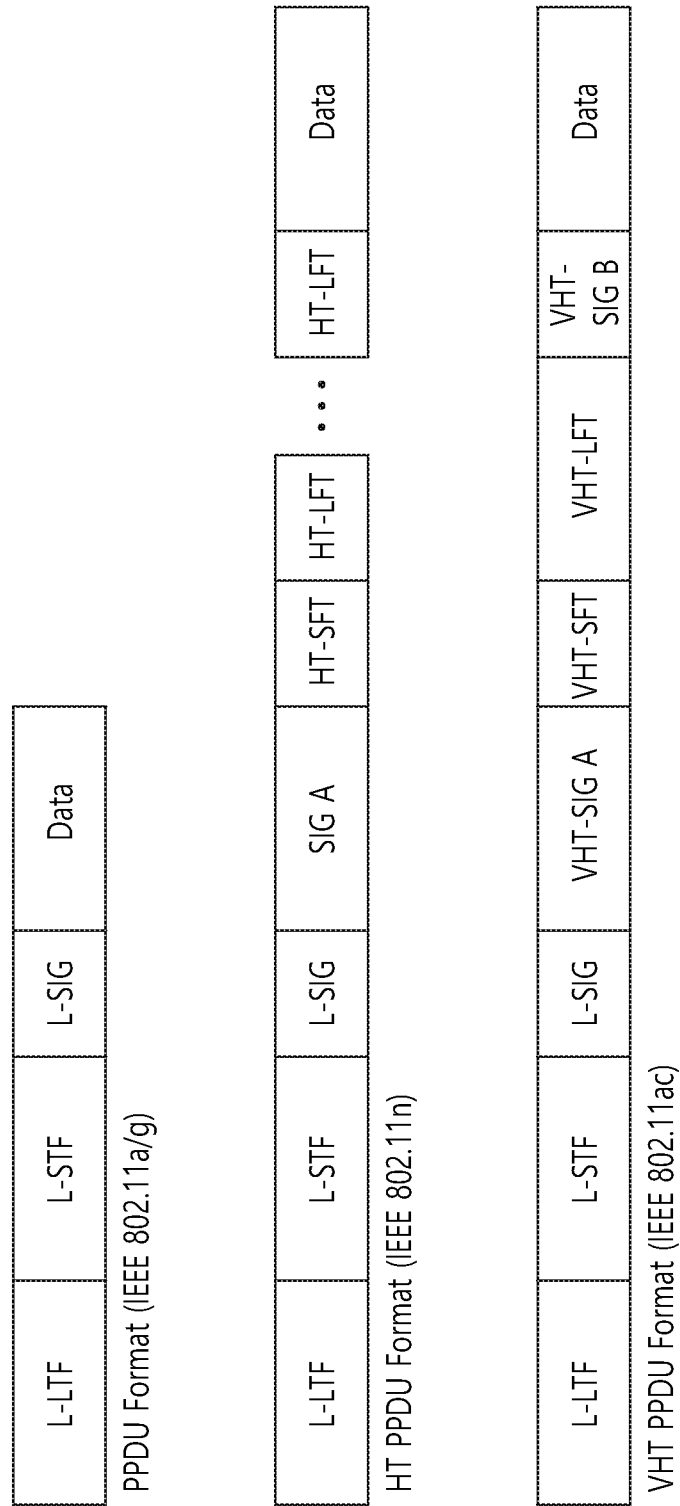
FIG. 2 is a diagram illustrating an example of a PPDU used in an IEEE standard.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network (WLAN). FIG. 1(A) illustrates the structure of an infrastructure basic service set (BSS) of institute of electrical and electronic engineers (IEEE) 802.11.

Referring the FIG. 1(A), the wireless LAN system 10 of the FIG. 1(A) may include one or more infrastructure BSSs 100 and 105 (hereinafter, referred to as BSS). The BSSs 100 and 105 as a set of an AP and an STA such as an access point (AP) 125 and a station (STA1) (100-1) which are successfully synchronized to communicate with each other are not concepts indicating a specific region.

For example, the BSS (100) may include one AP (110) and one or more STAs (100-1) which may be associated with one AP (110). The BSS (105) may include one or more STAs (105-1 and 105-2) which may be associated with one AP (130).

The infrastructure BSS (100, 105) may include at least one STA, APs (125, 130) providing a distribution service, and a distribution system (DS) (120) connecting multiple APs.

The distribution system (120) may implement an extended service set (ESS) (140) extended by connecting the multiple BSSs (100 and 105). The ESS (140) may be used as a term indicating one network configured by connecting one or more APs (110 or 130) through the distribution system (120). The AP included in one ESS (140) may have the same service set identification (SSID).

A portal (150) may serve as a bridge which connects the wireless LAN network (IEEE 802.11) and another network (e.g., 802.X).

In the BSS illustrated in the FIG. 1(A), a network between the APs (110 and 130) and a network between the APs (110 and 130) and the STAs (100-1, 105-1, and 105-2) may be implemented.

FIG. 1(B) illustrates a conceptual view illustrating the IBSS.

Referring to FIG. 1(B), a WLAN system (15) of FIG. 1(B) may be capable of performing communication by configuring a network between STAs in the absence of the APs (110 and 130) unlike in FIG. 1(A). When communication is performed by configuring the network also between the STAs in the absence of the AP (110 and 130), the network is defined as an ad-hoc network or an independent basic service set (IBSS).

Referring to the FIG. 1(B), the IBSS is a BSS that operates in an Ad-Hoc mode. Since the IBSS does not include the access point (AP), a centralized management entity that performs a management function at the center does not exist. That is, in the IBSS (15), STAs (150-1, 150-2, 150-3, 155-4, and 155-5) are managed by a distributed manner. In the IBSS, all STAs (150-1, 150-2, 150-3, 155-4, and 155-5) may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
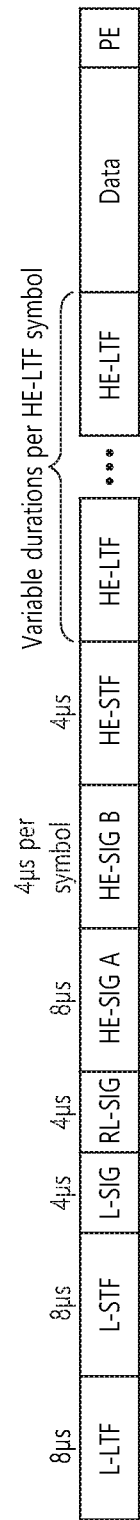
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted during an illustrated time period (that is, 4 or 8 μs). More detailed description of the respective fields of FIG. 3 will be made below.

Figure 4:
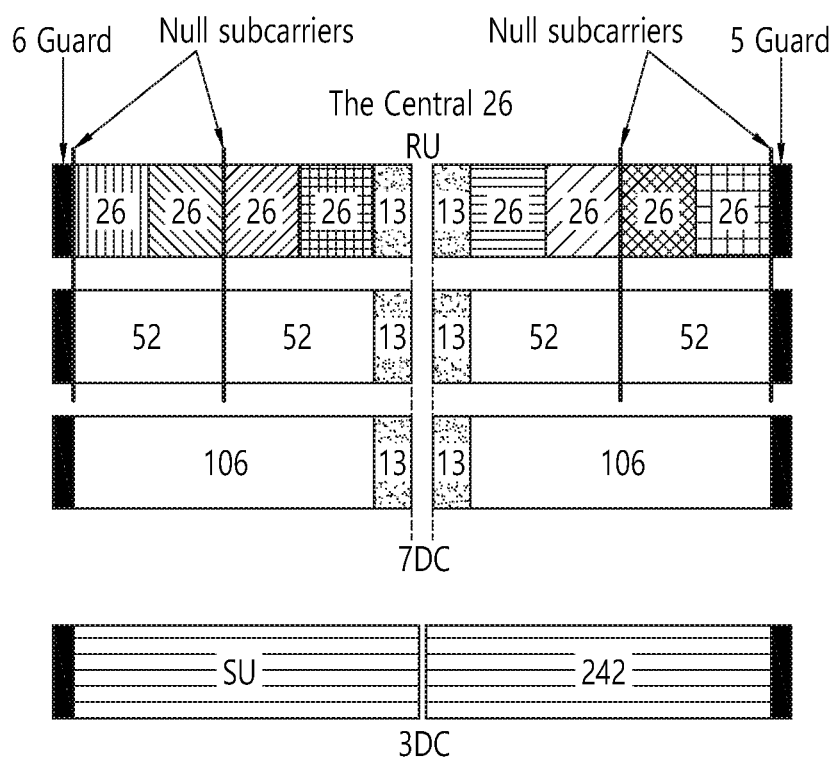
FIG. 4 is a diagram illustrating a layout of resource units used in a band of 20 MHz.

FIG. 4 is a diagram illustrating a layout of resource units (RUs) used in a band of 20 MHz. As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used, and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
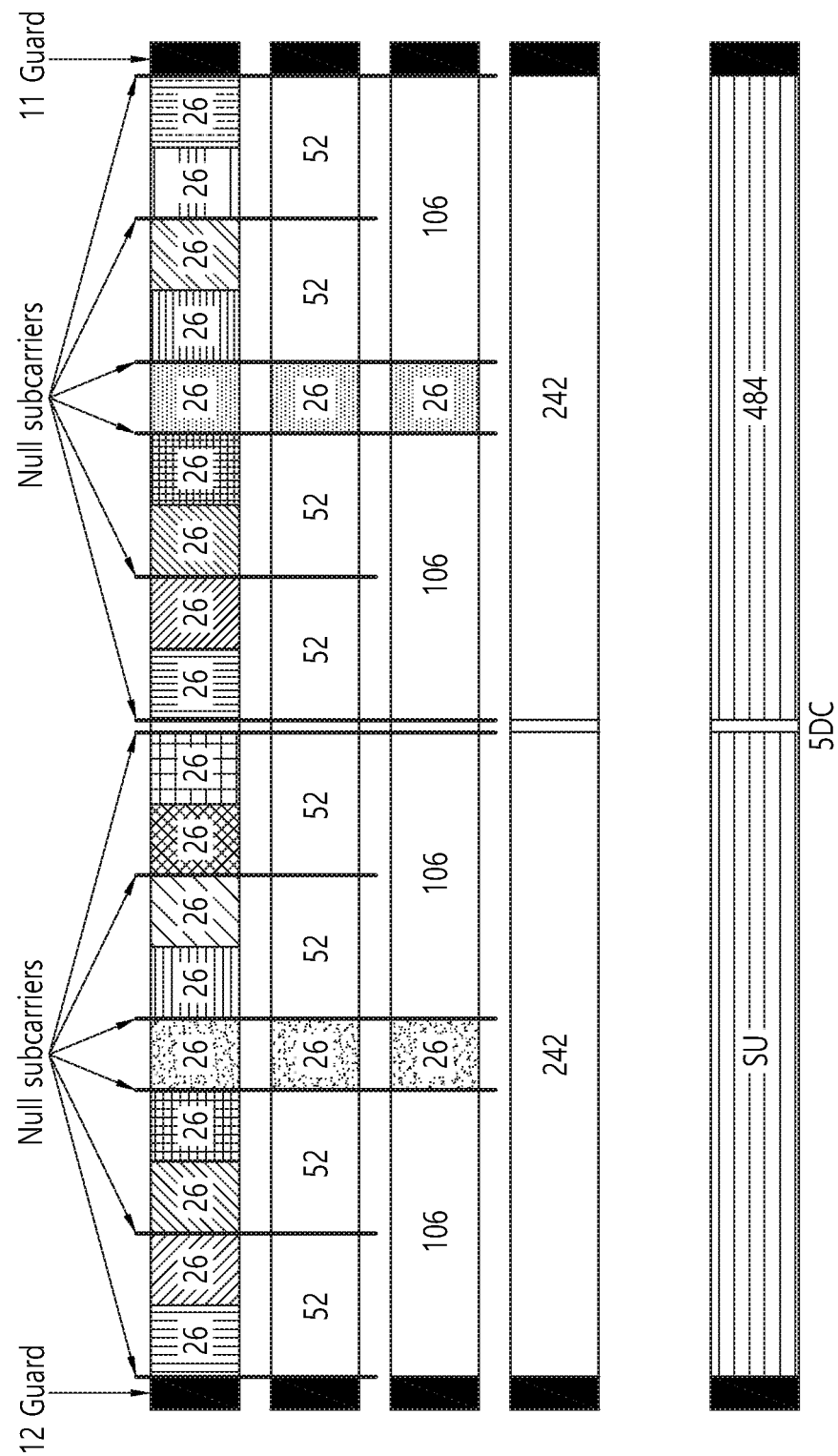
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
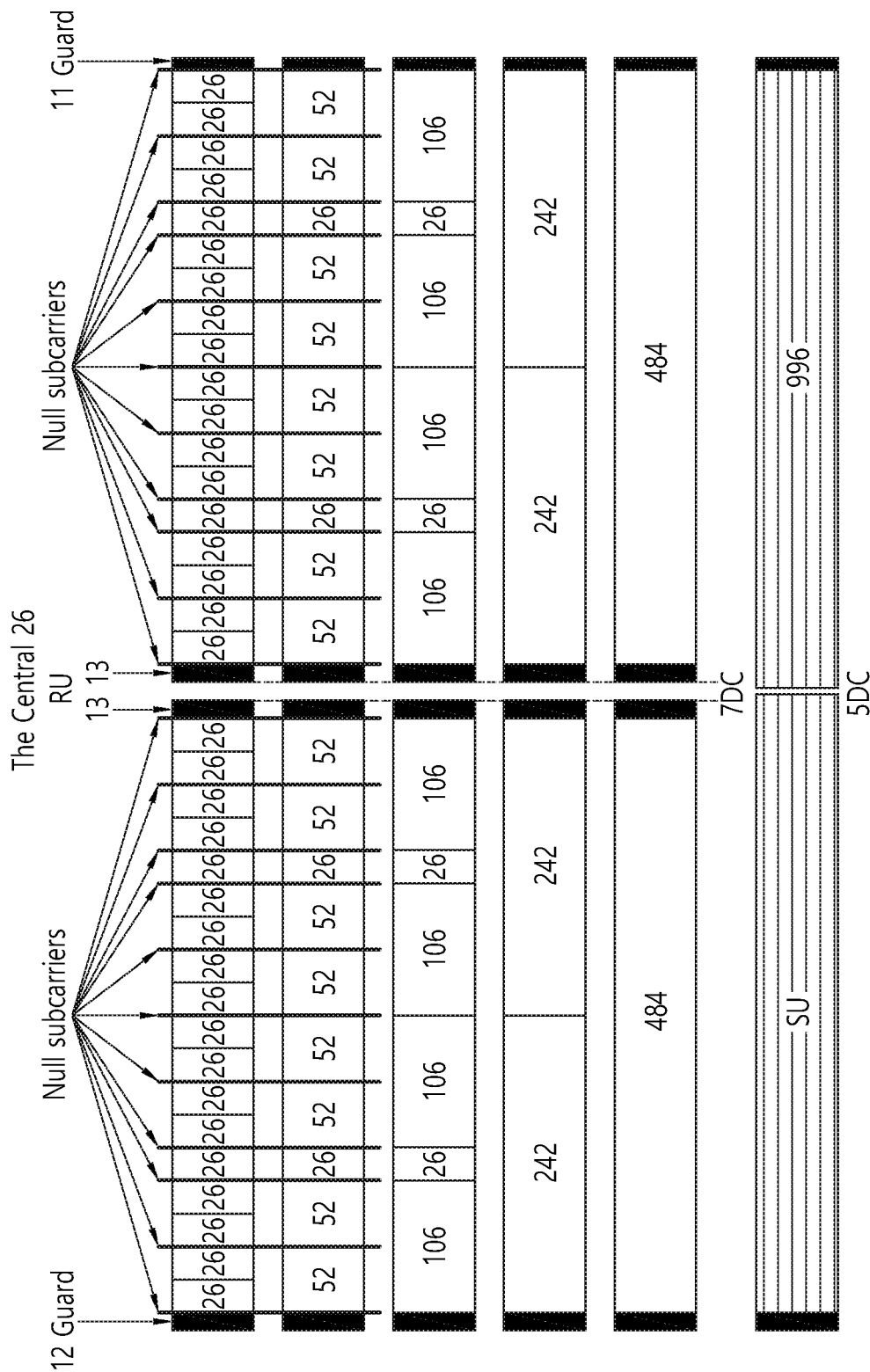
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted. Meanwhile, the detailed number of RUs may be modified similarly to one example of each of FIG. 4 or 5.

Figure 7:
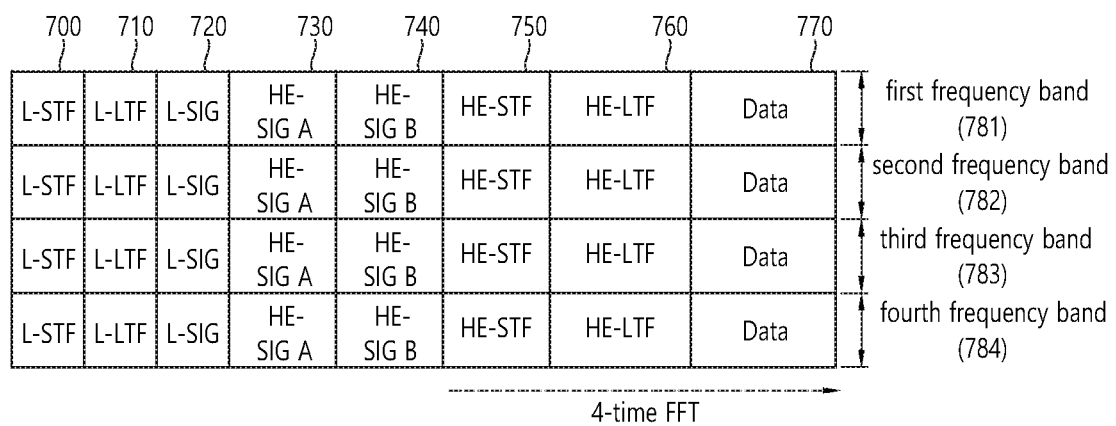
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA. The HE-SIG-B (740) will be described below in a greater detail with reference to FIG. 8.

A previous field of the HE-SIG-B (740) may be transmitted in a duplicated form on an MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a term called downlink data (alternatively, a downlink frame), and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
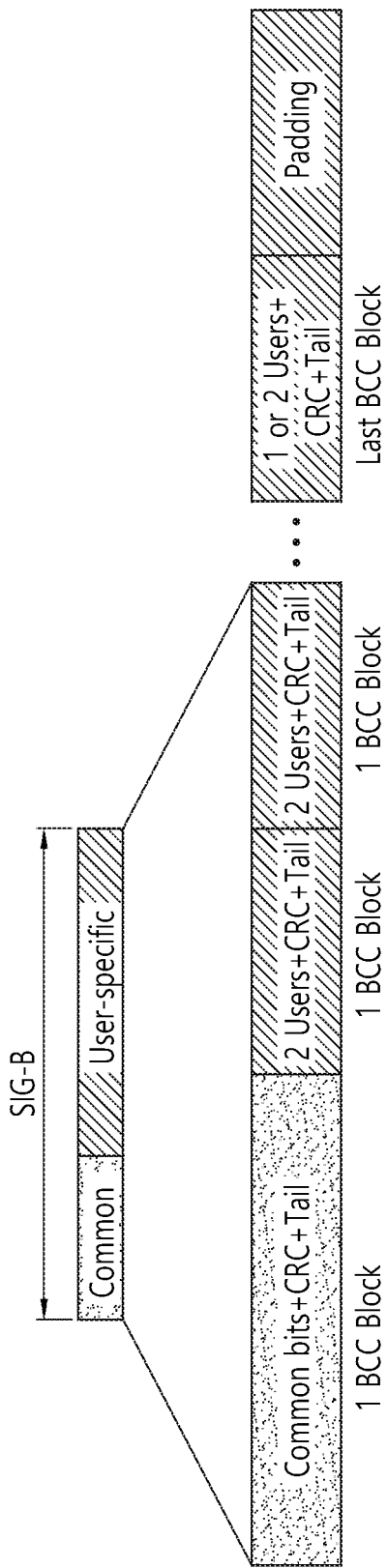
FIG. 8 is a block diagram illustrating one example of HE-SIG-B.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
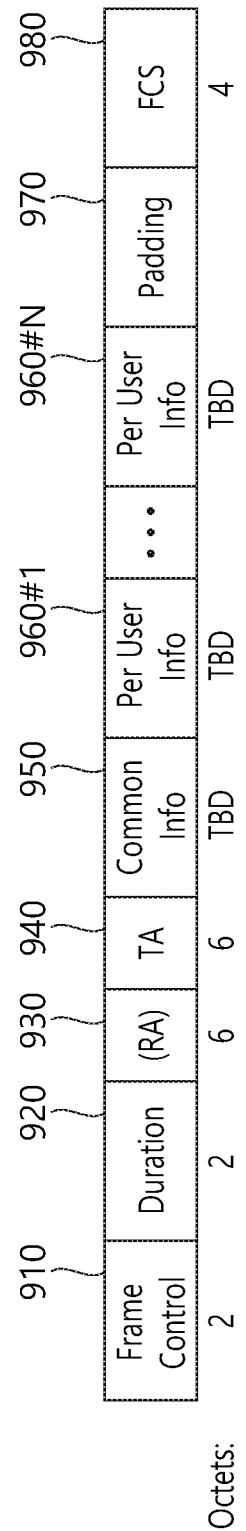
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

In addition, the RA field (930) may include address information of the receiving STA of a corresponding trigger frame and may be optionally omitted. The TA field (940) includes address information of an STA (e.g., AP) for transmitting the trigger frame, and the common information field (950) includes common control information applied to the receiving STA for receiving the trigger frame.

It is preferable that the trigger frame of FIG. 9 includes per user information fields (960 #1 to 960 #N) corresponding to the number of receiving STAs receiving the trigger frame of FIG. 9. The per user information field may also be referred to as a "RU Allocation field".

Additionally, the trigger frame of FIG. 9 may include a Padding field (970) and a Sequence field (980).

It is preferable that each of the per user information fields (960 #1 to 960 #N) shown in FIG. 9 further includes multiple sub-fields.

Figure 10:
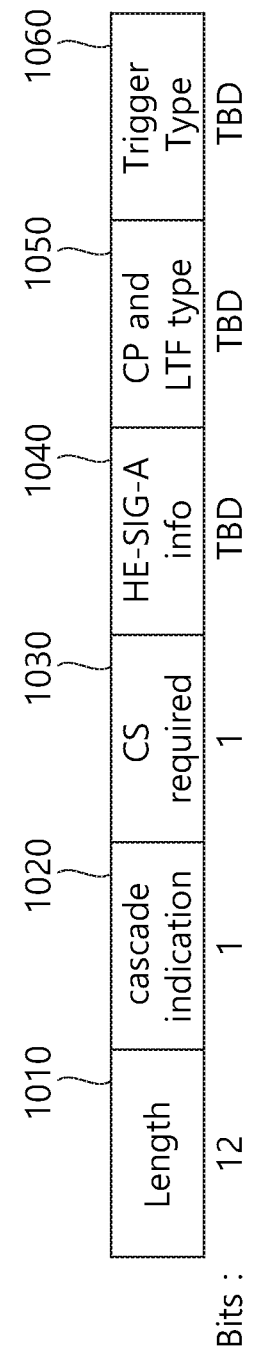
FIG. 10 illustrates an example of a common information field.

FIG. 10 illustrates an example of a common information field. Some parts of the sub-field of FIG. 10 may be omitted, and extra sub-fields may be added. Further, a length of each of the sub-fields shown herein may change.

As shown in the drawing, the Length field (1010) may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field (1010) of the trigger frame may be used for indicating the length of its respective uplink PPDU.

Additionally, a Cascade Indicator field (1020) indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field (1030) indicates whether or not the status or NAV of a wireless medium is required to be considered in a situation where a receiving device that has received the corresponding trigger frame transmits the respective uplink PPDU.

A HE-SIG-A information field (1040) may include information controlling the content of a SIG-A field (i.e., HE-SIG-A field) of an uplink PPDU, which is being transmitted in response to the corresponding trigger frame.

A CP and LTF type field (1050) may include information on a LTF length and a CP length of the uplink PPDU being transmitted in response to the corresponding trigger frame. A trigger type field (1060) may indicate a purpose for which the corresponding trigger frame is being used, e.g., general triggering, triggering for beamforming, and so on, a request for a Block ACK/NACK, and so on.

Figure 11:
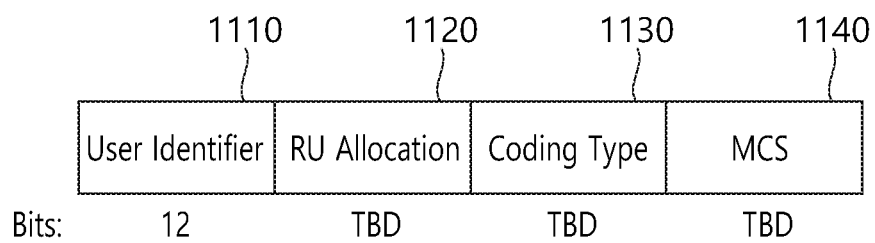
FIG. 11 illustrates an example of a sub-field being included in a per user information field.

FIG. 11 illustrates an example of a sub-field being included in a per user information field. Among the sub-fields of FIG. 11, some (or part) of the sub-fields may be omitted, and other additional sub-fields may also be added. Additionally, the length of each of the sub-fields shown in the drawing may be varied.

A User Identifier field (1110) of FIG. 11 indicates an identifier of an STA (i.e., receiving STA) to which the per user information corresponds, and an example of the identifier may correspond to all or part of the AID.

Additionally, a RU Allocation field (1120) may be included in the sub-field of the per user information field. More specifically, in case a receiving STA, which is identified by the User Identifier field (1110), transmits an uplink PPDU in response to the trigger frame of FIG. 9, the corresponding uplink PPDU is transmitted through the RU, which is indicated by the RU Allocation field (1120). In this case, it is preferable that the RU that is being indicated by the RU Allocation field (1120) corresponds to the RU shown in FIG. 4, FIG. 5, and FIG. 6.

The sub-field of FIG. 11 may include a Coding Type field (1130). The Coding Type field (1130) may indicate a coding type of the uplink PPDU being transmitted in response to the trigger frame of FIG. 9. For example, in case BBC coding is applied to the uplink PPDU, the Coding Type field (1130) may be set to '1', and, in case LDPC coding is applied to the uplink PPDU, the Coding Type field (1130) may be set to '0'.

Additionally, the sub-field of FIG. 11 may include an MCS field (1140). The MCS field (1140) may indicate an MCS scheme being applied to the uplink PPDU that is transmitted in response to the trigger frame of FIG. 9.

Figure 12:
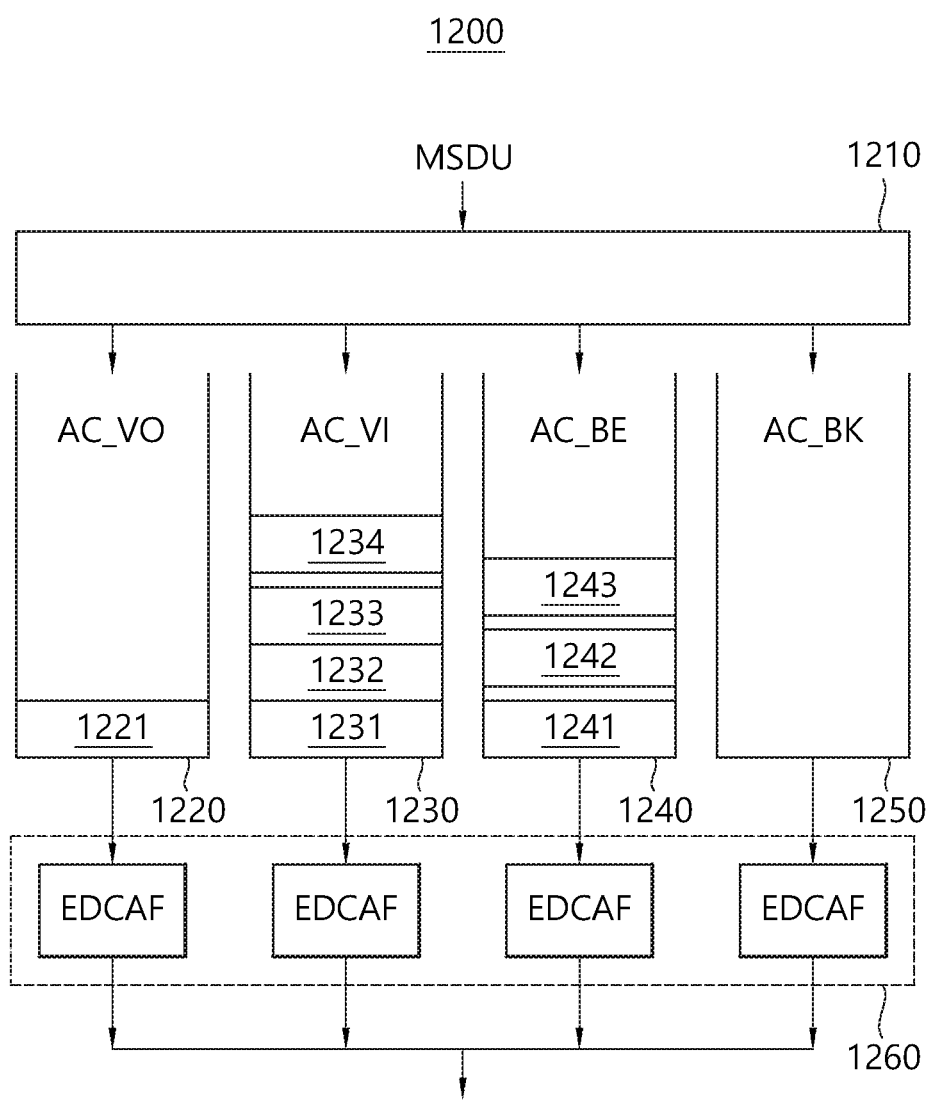
FIG. 12 illustrates an EDCA-based channel access method in a WLAN system according to an exemplary embodiment of this specification.

FIG. 12 illustrates an EDCA-based channel access method in a WLAN system according to an exemplary embodiment of this specification. In the WLAN system, an STA (or AP) performing enhanced distributed channel access (EDCA) may perform channel access according to a plurality of user priorities that are defined for the traffic data.

The EDCA for the transmission of a Quality of Service (QoS) data frame based on the plurality of user priority levels may be defined as four access categories (hereinafter referred to as 'ACs') (background (AC_BK), best effort (AC_BE), video (AC_VI), and voice (AC_VO)).

The STA performing channel access based on the EDCA may map traffic data departing from a logical link control (LLC) layer and reaching (or arriving at) a medium access control (MAC) layer, i.e., traffic data such as a MAC service data unit (MSDU), as shown below in Table 1. Table 1 indicates an exemplary mapping between user priority levels and ACs.

TABLE 1

| Priority | User priority | Access category (AC) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

A transmission queue and an AC parameter may be defined for each AC. The plurality of user priority levels may be implemented based on AC parameter values, which are differently configured for each AC.

More specifically, when the STA performing the channel access based on the EDCA performs a backoff procedure for transmitting a frame belonging to each AC, the corresponding STA may use each of an arbitration interframe space (AIFS)[AC], a CWmin[AC], and a CWmax[AC] instead of a DCF interframe space (DIFS), a CWmin, and a CWmax, which correspond to parameters for a backoff procedure based on a distributed coordination function (DCF).

The EDCA parameter set element may include information on channel access parameters for each AC (e.g., AIFS [AC], CWmin[AC], CWmax[AC]).

The EDCA parameters being used in the backoff procedure for each AC may be configured to have a default value or may be loaded in a beacon frame so as to be delivered to each STA from the AP. Additionally, as the values of the AIFS [AC] and the CWmin[AC] become lower (or smaller), since the delay time (or latency time) for the channel access becomes shorter, the corresponding STA may have a higher priority level, and, accordingly, a larger number of bands may be used in the given traffic environment.

In a case where a collision occurs between the STAs, while the STA is transmitting a frame, the backoff procedure of the EDCA, which generates a new backoff count, is similar to the backoff procedure of the conventional DCF. However, the backoff procedure of the EDCA, which is differentiated for each AC, may be performed based on the EDCA parameters being individually set up (or configured) for each AC. The EDCA parameter may function as an important means that is used for distinguishing (or differentiating) the channel access of traffic corresponding to the diverse user priority levels.

An adequate configuration of EDCA parameter values being defined for each AC may optimize network performance and may also increase a transmission effect according to the priority level of the traffic at the same time. Therefore, the AP may be capable of performing a function of overall management and control of EDCA parameters in order to ensure a fair medium access to all STAs participating in the network.

In this specification, the user priority level that is predefined for the traffic data (or traffic) may be referred to as a traffic identifier (hereinafter referred to as 'TID').

The transmission priority level of the traffic data may be determined based on the user priority level. Referring to Table 1, the traffic ID (TID) of the traffic data having the highest user priority level may be set to '7'. More specifically, the traffic data having its traffic identifier set to '7' may be understood as the traffic having the highest transmission priority level.

Referring to FIG. 12, one STA (or AP) (1200) may include a virtual mapper (1210), a plurality of transmission queues (1220 to 1250), and a virtual collision handler (1260).

The virtual mapper (1210) of FIG. 12 may perform a function of mapping an MSDU that is received from a logical link control (LLC) layer to transmission queues corresponding to each AC in accordance with Table 1, which is presented above.

The plurality of transmission queues (1220~1250) of FIG. 12 may perform the functions of individual EDCA contention entities for wireless media access within an STA (or AP).

For example, the transmission queue (1220) of the AC_VO type of FIG. 12 may include one frame (1221) for a second STA (not shown). The transmission queue (1230) of the AC_VI type may include 3 frames (1231~1233) for a first STA (not shown) and one frame (1234) for a third STA in accordance with a transmission order by which the frames are to be transmitted to a physical layer.

The transmission queue (1240) of the AC_BE type of FIG. 12 may include one frame (1241) for a second STA (not shown), and one frame (1242) for a third STA (not shown), and one frame (1243) for a second STA (not shown) in accordance with a transmission order by which the frames are to be transmitted to a physical layer.

As an example, in case a buffered frame does not exist in the transmission queue (1250) of the AC_BK type of FIG. 12, the transmission queue (1250) of the AC_BK type of FIG. 12 may not include a frame that is to be transmitted to a physical layer.

If two or more ACs each having completed the backoff procedure exist in the STA at the same time, collision between the ACs may be adjusted (or controlled) in accordance with an EDCA function (EDCAF), which is included in the virtual collision handler (1260).

More specifically, when collision between the ACs occurs, the frame that is buffered for the AC having the higher priority level may be transmitted beforehand. Additionally, other ACs may increase the contention window value and may update the values configured in a backoff count.

A transmission opportunity (TXOP) may be initiated (or started) when a channel is accessed in accordance with an EDCA rule. When two or more frames are accumulated in one AC, and if an EDCA TXOP is acquired, the AC of an EDCA MAC layer may attempt to perform multiple frame transmissions. If the STA has already transmitted one frame, and if the STA is also capable of transmitting a next frame existing in the same AC within the remaining TXOP time and then capable of receiving its respective ACK, the STA may attempt to perform the transmission of the corresponding next frame after an SIFS time interval.

A TXOP limit value may be configured as a default value in the AP and the STA, or a frame that is related to the TXOP limit value may be transported (or delivered) to the STA from the AP.

If the size of the data frame that is to be transmitted exceeds the TXOP limit value, the STA may perform fragmentation on the corresponding frame into a plurality of smaller frames. Subsequently, the fragmented frames may be transmitted within a range that does not exceed the TXOP limit value.

Figure 13:
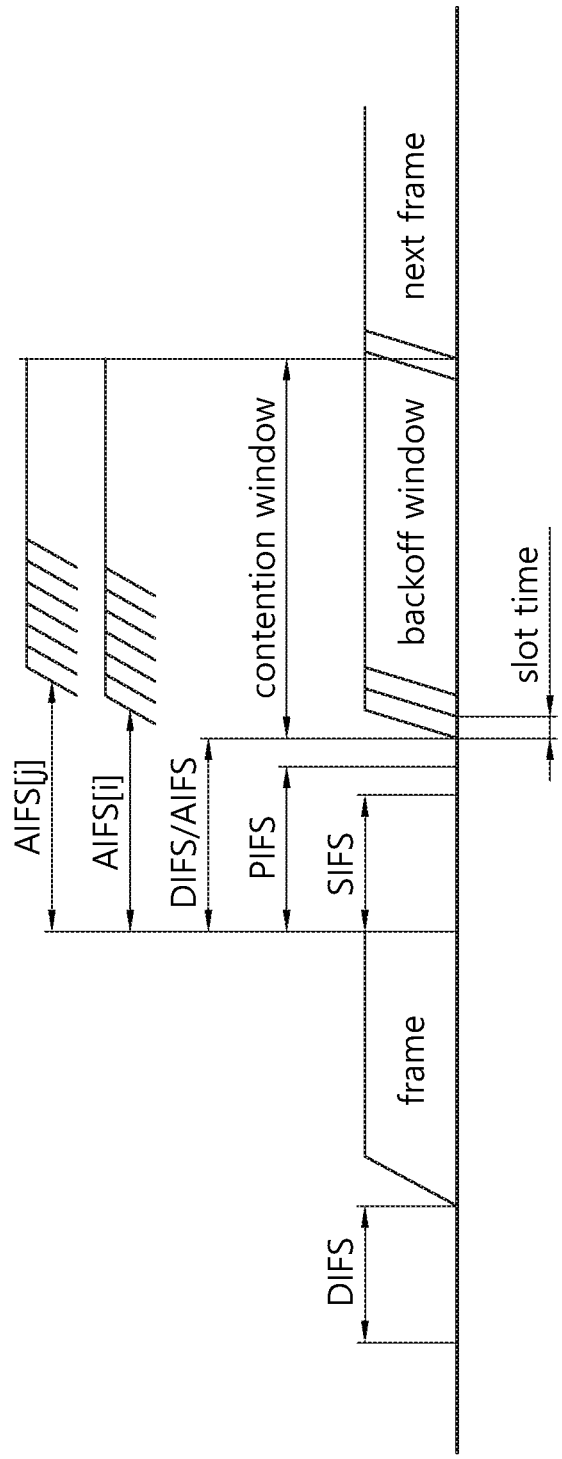
FIG. 13 is a conceptual diagram illustrating a backoff procedure according to EDCA according to an exemplary embodiment of this specification.

FIG. 13 is a conceptual diagram illustrating a backoff procedure according to an EDCA procedure according to an exemplary embodiment of the present invention. Referring to FIG. 12 and FIG. 13, the traffic data (or traffic) may be transmitted in accordance with a contention-based EDCA procedure according to the corresponding user priority level. For example, the priority level that is assigned to each set of traffic data may be set to any one of the 8 user priority levels indicated in Table 1.

As described above, one STA (or AP) may include 4 output queues (i.e., transmission queues). Each transmission queue may perform a channel access operation in accordance with the rules of the EDCA procedure. Each transmission queue may transmit traffic data based different Arbitration Interframe Space (AIFS) values according to the user priority levels instead of the conventionally used DCF Interframe Space (DIFS).

Additionally, in case traffic having different user priority levels are transmitted from the STA (or AP) at the same time, by adjusting the transmission so that the traffic having the higher user priority level is transmitted firsthand, the wireless LAN system may prevent collision from occurring between the STAs.

In order to initiate (or start) the backoff procedure, each STA (or AP) sets up (or configures) a backoff time (Tb[i]) to a backoff timer. As a pseudo-random integer value, the backoff time (Tb[i]) may be calculated by using Equation 1 shown below.

$$T_b[i]=\text{Random}(i) \times \text{SlotTime} \qquad \text{[Equation 1]}$$

Herein, Random(i) refers to a function using uniform distribution and generating a random integer between 0 and CW[i]. CW[i] corresponds to a contention window that is selected between a minimum contention window CWmin[i] and a maximum contention window CWmax[i]. i indicates a user priority level of the traffic data.

In case the STA performing the backoff procedure transmits a frame, and when a re-transmission is needed due to the occurrence of a collision, Equation 2 shown below may be used. More specifically, each time a collision occurs, a new contention window $CW_{new}[i]$ may be calculated by using a previous (or old) contention window $CW_{old}[i]$.

$$CW_{new}[i]=((CW_{old}[i]+1) \times \text{PF}-1 \qquad \text{[Equation 2]}$$

Herein, a PF value may be calculated in accordance with a procedure that is defined in the IEEE 802.11e standard. The CWmin[i], CWmax[i], AIFS[i], and PF values, which correspond to the EDCA parameters, may each be set as a default value in each STA (or AP). Alternatively, the EDCA parameters may be received from the AP through a QoS parameter set element, which is included in a management frame.

Hereinafter, in the exemplary embodiment of the present invention, the device (or terminal) may correspond to an apparatus that is capable of supporting both the wireless LAN system and the cellular system. More specifically, the device may be interpreted as a UE supporting the cellular system or as an STA supporting the wireless LAN system.

Based on Equation 1 and Equation 2, which are presented above, when the backoff procedure of the transmission queue (1230) of the AC_VI type of FIG. 12 is ended (or completed) beforehand, the transmission queue 1230 of the AC_VI type may acquire a transmission opportunity (hereinafter referred to as 'TXOP') allowing access to the medium.

The AP (1200) of FIG. 12 may determine the transmission queue (1230) of the AC_VI type as a primary AC and may determine the remaining transmission queues (1220, 1240, and 1250) as secondary ACs.

As described above, a process of performing a backoff procedure on the plurality of transmission queues (1220~1250) and determining the transmission queue having its backoff procedure completed beforehand as the primary AC may be referred to as a primary AC rule.

A transmission opportunity section according to a transmission opportunity (TXOP) may be determined based on the primary AC, which is determined in accordance with the above-described primary AC rule. Additionally, frames that are included in a secondary AC may also be transmitted in the transmission opportunity section, which is determined based on the primary AC.

Figure 14:
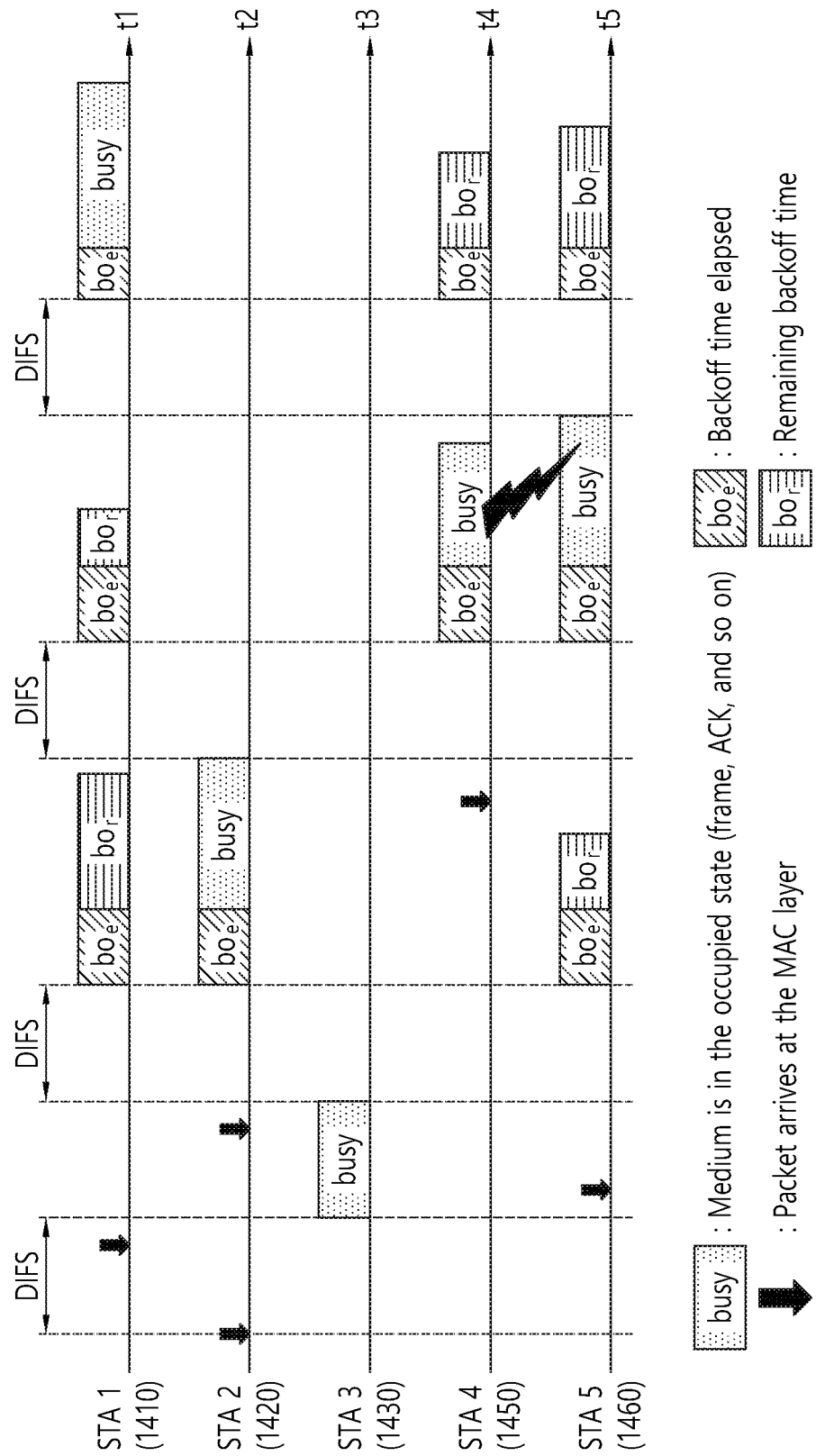
FIG. 14 is a diagram for describing a backoff cycle and a frame transmission procedure in a wireless communication system of this specification.

FIG. 14 is a diagram for describing a backoff cycle and a frame transmission procedure in a wireless LAN system according to this specification. Referring to FIG. 14, a horizontal axis (t1~t5) for each of first to fifth STAs (1410~1450) may represent a time axis. Also, a vertical axis for each of the first to fifth STAs (1410~1450) may represent a backoff time that is being transmitted.

Referring to FIG. 13 and FIG. 14, when a specific medium is shifted from an Occupied state (or Busy state) to an Idle state, the plurality of STAs may attempt to transmit data (or frames).

At this point, as a solution for minimizing collision between the STAs, each STA may select a backoff time (Tb lip indicated in Table 1 and may, then, attempt to perform transmission after standing-by (or waiting) for as long as one slot time corresponding to the selected backoff time (Tb[i]).

When the backoff procedure is initiated (or started), each STA may perform countdown of the selected backoff count time in slot time units. Each STA may continuously monitor the medium while performing the countdown. If the medium is monitored while being in the Occupied state, the STA may suspend the countdown and be on stand-by. If the medium is monitored while being in the Idle state, the STA may resume the countdown.

Referring to FIG. 14, when a frame for a third STA (1430) reaches a MAC layer of the third STA (1430), the third STA (1430) may verify whether or not the medium is in the Idle state during a DIFS. Subsequently, if it is determined that the medium is in an Idle state during a DIFS, the third STA (1430) may transmit a frame to an AP (not shown). Herein, although an inter frame space (IFS) of FIG. 14 is illustrated as a DIFS, it should be understood that this specification will not be limited only to this.

While a frame is being transmitted from the third STA (1430), each of the remaining STAs may verify the Occupied state of the medium and may then be on stand-by during the transmission period of the frame. The frame may reach MAC layers corresponding to each of the first STA (1410), the second STA (1420), and the fifth STA (1450). When it is verified that the medium is in the Idle state, each STA may be on stand-by for as long as on DIFS and may, then, perform countdown of a backoff time, which is individually selected by each STA.

Referring to FIG. 14, the drawing shows an exemplary case where the second STA (1420) selects a shortest backoff time (or a smallest backoff time value), and wherein the first STA (1410) selects a longest backoff time (or a largest backoff time value). At a transmission start point (T1) for transmitting a frame, after completing the backoff procedure corresponding to the backoff time, which is selected by the second STA (1420), FIG. 14 shows an exemplary case where the remaining backoff time of the fifth STA (1450) is shorter than the remaining backoff time of the first STA (1451).

When the medium is occupied by the second STA (1420), the first STA (1410) and the fifth STA (1450) may suspend their backoff procedures and may be on stand-by. Thereafter, when the medium occupation of the second STA (1420) is completed (or ended) (i.e., if the medium returns to the Idle state), the first STA (1410) and the fifth STA (1450) may be on stand-by for as long as a DIFS.

Subsequently, the first STA (1410) and the fifth STA (1450) may resume their backoff procedures, which were suspended earlier, based on the remaining backoff time. In this case, since the remaining backoff time of the fifth STA (1450) is shorter than the remaining backoff time of the first STA (1410), the fifth STA (1450) may complete its backoff procedure earlier than the first STA (1410).

Meanwhile, referring to FIG. 14, when the medium is occupied by the second STA (1420), a frame for the fourth STA (1440) may reach a MAC layer of the fourth STA (1440). When the medium returns to its Idle state, the fourth STA (1440) may be on stand-by for as long as a DIFS.

Thereafter, the fourth STA (1440) may perform countdown of a backoff time, which is selected by the fourth STA (1440).

Referring to FIG. 14, the remaining backoff time of the fifth STA (1450) may coincidently be identical to the backoff time of the fourth STA (1440). In this case, collision may occur between the fourth STA (1440) and the fifth STA (1450). When a collision occurs between the STAs, both the fourth STA (1440) and the fifth STA (1450) may become incapable of receiving ACKs and may also fail to perform data transmission.

Accordingly, the fourth STA (1440) and the fifth STA (1450) may individually calculate a new contention window ($CW_{new}[i]$) according to Equation 2, which is presented above. Subsequently, the fourth STA (1440) and the fifth STA (1450) may individually perform countdown of the backoff time, which is newly calculated in accordance with Equation 2, which is presented above.

Meanwhile, when the medium is in an Occupied state due to the transmission performed by the fourth STA (1440) and the fifth STA (1450), the first STA (1410) may be on stand-by. Subsequently, when the medium returns to the Idle state, the first STA (1410) may be on stand-by for as long as a DIFS and may, then, resume the backoff counting. When the remaining backoff time of the first STA (1410) is elapsed, the first STA (1410) may transmit a frame.

A CSMA/CA mechanism may also include virtual carrier sensing in addition to physical carrier sensing, wherein the AP and/or STA directly senses the medium.

Virtual carrier sensing is performed to compensate problems that may occur during medium access, such as a hidden node problem, and so on. In order to perform virtual carrier sensing, a MAC of the WLAN system uses a Network Allocation Vector (NAV). The NAV corresponds to a value that is indicated by an AP and/or an STA that is currently using the medium or that has the authority to use the medium to another AP and/or STA, wherein the value indicates the time remaining until the medium returns to its state of being available for usage. Accordingly, a value that is set as the NAV corresponds to a time period during which the usage of the medium is scheduled by the AP and/or STA, which transmits the corresponding frame, and the STA receiving the NAV value is prohibited from accessing the medium during the corresponding time period. For example, the NAV may be configured in accordance with a value of the duration field of the MAC header of the corresponding frame.

Figure 15:
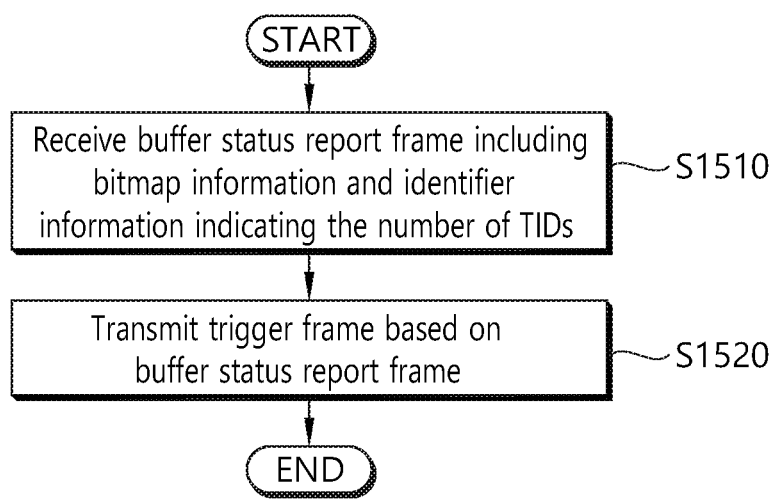
FIG. 15 is a diagram for describing an uplink transmission in a wireless LAN system according to an exemplary embodiment of this specification.

FIG. 15 is a flow chart showing a method for performing an uplink transmission in a wireless LAN system according to an exemplary embodiment of this specification. Referring to FIG. 1 to FIG. 15, in step S1510, an access point (AP) may receive a frame for buffer status report (hereinafter referred to as a 'buffer status report frame') from a receiving STA that is associated with the AP.

The buffer status report frame of FIG. 15 may include bitmap information for an access category for which the buffer status of the receiving STA is to be reported and identifier information indicating a number of traffic identifiers corresponding to the traffic being buffered by the receiving STA based on the number of access categories that are indicated by the bitmap information.

The buffer status according to the exemplary embodiment of this specification may include information being related to a traffic size of the traffic buffered by the receiving STA. The identifier information according to the exemplary embodiment of this specification may refer to a number of traffic identifiers (TIDs) being associated with the transmission priority levels, which are mentioned above in FIG. 13 and FIG. 14. The buffer status report frame, which is mentioned in step S1510, will hereinafter be described in more detail with reference to the accompanying drawing.

In step S1520, the AP may transmit a trigger frame for multiple user STAs participating in an uplink Multi-user Multiple Input Multiple Output (UL MU MIMO) transmission based on the buffer status report frame.

Although it is not shown in FIG. 15, the multiple user STAs participating in the UL MU MIMO transmission may receive a trigger frame. The multiple user STAs may transmit multiple uplink frames based on the resource units that are individually (or separately) assigned in accordance with individual (or separate) user information fields (e.g., 960 #1 to 960 #N of FIG. 9) of the trigger frame.

Subsequently, in order to collectively announce (or notify) the successful reception of the multiple uplink frames, the AP may transmit a Multi-STA block ACK (BA) frame. The Multi-STA block ACK (BA) frame is described in detail in Section 9.3.1.9.7 of the standard document IEEE P802.11ax/D1.0, which was disclosed in November, 2016.

Figure 16:
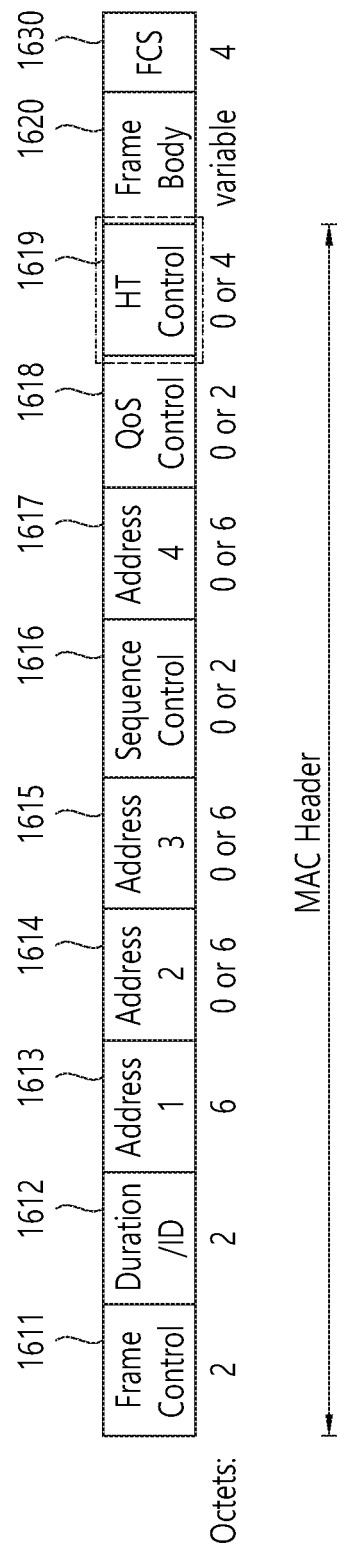
FIG. 16 shows an example of a MAC frame for a buffer status report frame according to an exemplary embodiment of this specification.

FIG. 16 shows an example of a MAC frame for a buffer status report frame according to an exemplary embodiment of this specification.

A MAC frame (1600) according to the exemplary embodiment of this specification may include a plurality of fields (1611~1619) configuring a MAC header, a frame body field (1620) including a payload and having a variable length, and an FCS field (1630) for error detection of a receiving device.

In the MAC header, a frame control field (1611), a duration/ID field (1612), a first address field (1613), and the FCS field (1630) may be included in all types of MAC frames.

Conversely, a second address field (1614), a third address field (1615), a sequence control field (1616), a fourth address field (1617), a QoS control field (1618), a HT control field (1619), and a frame body field (1620) may be selectively included in accordance with the type of the MAC frame.

When a QoS data frame or a QoS null frame is indicated by the frame control field (1611), the QoS control field (1618) may be included in the MAC frame.

The QoS control field (1618) is configured of 2 octets (16 bits). The QoS control field (1618) may be configured as shown below in Table 2.

TABLE 2

| Applicable frame (sub) types | Bits 0-3 | Bit 4 | Bits 5-6 | Bit 7 | Bits 8 Bit 9 Bit 10 Bits 11-15 |
|---|---|---|---|---|---|
| QoS Data and QoS Data + CF-Ack frames sent by non-AP STAs | TID | 0 | Ack Policy | A-MSDU Present | TXOP Duration Requested |
| that are not a TPU buffer STA or a TPU sleep STA in a nonmesh BSS | TID | 1 | Ack Policy | A-MSDU Present | Queue Size |
| QoS Null frames sent by | TID | 0 | Ack | Reserved | TXOP Duration Requested |

TABLE 2-continued

| Applicable frame (sub) types | Bits 0-3 | Bit 4 | Bits 5-6 | Bit 7 | Bits 8 | Bit 9 | Bit 10 | Bits 11-15 |
|---|---|---|---|---|---|---|---|---|
| non-AP STAs that are not a TPU buffer STA or a TPU sleep STA in a nonmesh BSS | TID | 1 | Policy Ack Policy | Reserved | | Queue Size | | |

Referring to Table 2, first to fourth bits (Bit0 to Bit3) may correspond to a region for a traffic identifier (hereinafter referred to as 'TID'). The user priority levels (0 to 7) for the traffic identifier (TID) information may be mapped to values of '0' to '7', which can be expressed by using first to fourth bits (Bit0 to Bit3). The remaining values '8' to '15', which can be expressed by the first to fourth bits (Bit0 to Bit3), may be reserved.

More specifically, the STA (or AP) may announce (or notify) traffic identifier (TID) information corresponding to the traffic that is being buffered to the STA through the first bit to the fourth bit (Bit0 to Bit3) of the QoS control field (1618).

For example, if the fifth bit (Bit4) of the QoS control field (1618) is set to '1', the ninth bit to sixteenth bit (Bit8 to Bit15) of the QoS control field (1618) may indicate queue size information of the traffic being buffered to the queue of the corresponding STA.

In case multiple buffered traffic exist in the STA, the STA may notify (or announce) queue size information to the buffered traffic based on the HT control field (1619) of the MAC frame (1600).

A method for reporting diverse information on the multiple traffics by using the HT control field (1619) will hereinafter be described in more detail with reference to the accompanying drawings.

Figure 17:
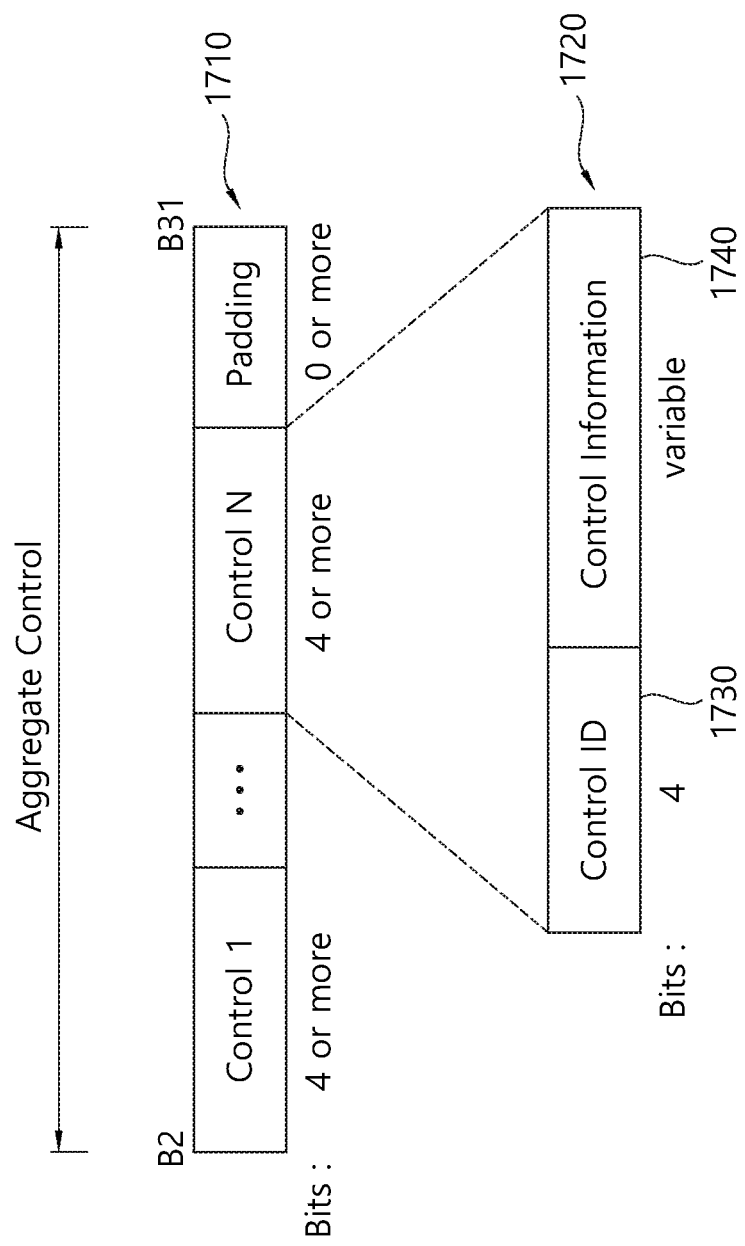
FIG. 17 shows an exemplary format of an A-Control field for a buffer status report frame according to an exemplary embodiment of this specification.

FIG. 17 shows an exemplary format of an A-Control field for a buffer status report frame according to an exemplary embodiment of this specification. Referring to FIG. 1 to FIG. 17, the A-Control field (1710) of FIG. 17 may be a field corresponding to the HT control field (1619) of FIG. 16.

More specifically, an A-Control field (1710) may be configured of 4 octets (32 bytes). If a first bit and a second bit (B0-B1) (not shown) of the HT control field (1619) shown in FIG. 16 are set to '11', the remaining bits (B2-B31) may be assigned for the A-Control field (1710) of FIG. 17.

The A-Control field (1710) may include at least one control sub-field (Control 1~Control N). For example, the $N^{th}$ control sub-field (Control N, 1720) may include a control ID sub-field (1730) having a length of 4 bits and a control information sub-field (1740) having a variable length.

The control ID sub-field (1730) may indicate a type of the information being included in the control information sub-field (1740). The control information sub-field (1740), which is related to the value of the control ID sub-field (1730), may be defined as shown below in Table 3.

TABLE 3

| Control ID value | Meaning | Length of the Control Information subfield (bits) |
|---|---|---|
| 0 | UL MU response scheduling | 26 |
| 1 | Operating Mode | 12 |
| 2 | HE link adaptation | 16 |
| 3 | Buffer Status Report (BSR) | 26 |
| 4 | UL Power Headroom | 8 |

TABLE 3-continued

| Control ID value | Meaning | Length of the Control Information subfield (bits) |
|---|---|---|
| 5 | Bandwidth Query Report (BQR) | 10 |
| 6-15 | Reserved | — |

Referring to Table 3, when the control ID sub-field (1730) is set to '1', the control information sub-field (1740) may indicate information for requesting a change (or shift) in the operating mode of the STA that transmits a frame by using 12 bits.

When the control ID sub-field (1730) is set to '3', the control information sub-field (1740) may indicate may indicate information for a buffer status report of the STA, which transmits a frame by using 26 bits.

Hereinafter, for a clear and simple understanding of this specification, it will be assumed that the control ID sub-field (1730) of the A-Control field (1710) for the buffer status report is set to '3'.

Figure 18:
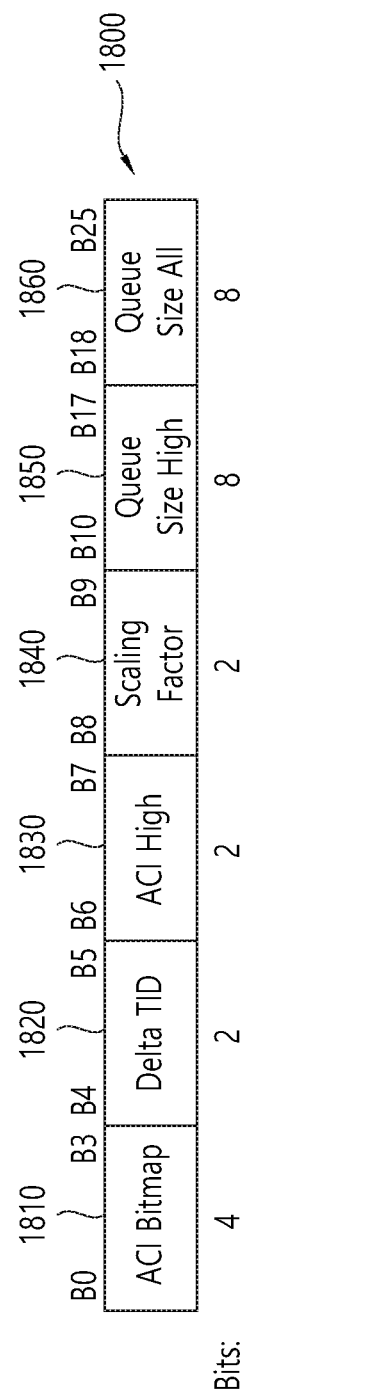
FIG. 18 shows an exemplary format of a control information sub-field for a buffer status report frame according to an exemplary embodiment of this specification.

FIG. 18 shows an exemplary format of a control information sub-field for a buffer status report frame according to an exemplary embodiment of this specification. Referring to FIG. 1 to FIG. 18, the control information sub-field (1800) may be understood as a field corresponding to the control information sub-field (1740) of FIG. 17. The control information sub-field (1800) of FIG. 18 may include first to sixth sub-fields (1810~1860).

The first sub-field (1810) is configured of a first bit to a fourth bit (B0-B3) and may be referred to as an Access Category Indication (hereinafter referred to as 'ACI') bitmap field. The first sub-field (1810) may include bitmap information for an access category for which the buffer status of the receiving STA, which is associated with the AP, is to be reported. As described above, the buffer status may correspond to information that is related to the traffic size of the traffic buffered by the receiving STA.

More specifically, among the first to fourth bits (B0-B3) of the first sub-field (1810), the bit located at a position corresponding to the access category to which the buffer status is to be reported may be indicated as '1'. Additionally, among the first to fourth bits (B0-B3) of the first sub-field (1810), the bit located at a position corresponding to the access category to which the buffer status is not reported may be indicated as '0'.

The second sub-field (1820) according to the exemplary embodiment of this specification is configured of a fifth bit to a sixth bit (B4-B5) and may be referred to as a Delta TID field. According to this exemplary embodiment, the Delta TID field may indicate a number of traffic identifiers (TIDs) for the traffic being buffered by the receiving STA based on the number of access categories indicated by the Access Category Indication (ACI) bitmap field.

Referring to FIG. 1 to FIG. 18, according to this exemplary embodiment, the number of traffic identifiers (TIDs) related to the traffic being buffered to a first access category (i.e., AC_VO) of the receiving STA may be signaled to the AP based on the first sub-field (1810) and the second sub-field (1820), as shown below in Table 4.

TABLE 4

| Number of bits in the ACI Bitmap subfield that are set to 1 | Mapping of Delta TID subfield value and number of TIDs (N_TID) |
|---|---|
| 0 | Values 0 to 2 are not applicable; Value 3 indicates 8 TIDs(i.e., all ACs have traffic) |
| 1 | Value 0 indicates 1 TID; Value 1 indicates 2 TIDs; Values 2 to 3 are not applicable; |
| 2 | Value 0 indicates 2 TIDs; Value 1 indicates 3 TIDs; Value 2 indicates 4 TIDs; Value 3 is not applicable; |
| 3 | Value 0 indicates 3 TIDs; Value 1 indicates 4 TIDs; Value 2 indicates 5 TIDs; Value 3 indicates 6 TIDs; |
| 4 | Value 0 indicates 4 TIDs; Value 1 indicates 5 TIDs; Value 2 indicates 6 TIDs; Value 3 indicates 7 TIDs; |

Referring to Table 4, the number of traffic identifiers (N_TID) according to the exemplary embodiment of this specification may be expressed by using Equation 3 shown below.

$$N\_TID = N\_ones + F\_val \quad \text{[Equation 3]}$$

Referring to Equation 3, a sum of the number of '1's (N_ones) being set to the first sub-field (1810) and a value (F_val) being set to the second sub-field (1820) may be understood as the number of traffic identifiers (N_TID). Herein, however, in case of the number of '1's (N_ones) being set to the first sub-field (1810) is equal to '0', the value (F_val) being set to the second sub-field (1820) may be pre-configured as '8'.

More specifically, the identifier information being configured (or set) to the second sub-field (1820) may be set to a value obtained by subtracting a number of traffic identifiers related to the traffic being buffered to the user STA that is equivalent to a number of access categories being indicated by the first sub-field (1810).

Hereinafter, an exemplary embodiment wherein the number of traffic identifiers (TIDs) being buffered by the receiving STA is expressed based on the first sub-field (1810) and the second sub-field (1820).

For simplicity in the description, among the first to fourth bits (B0-B3) of the first sub-field (1810), the first bit (B0) may correspond to the first access category (i.e., AC_VO) having the highest priority level. It will be assumed that the second bit (B1) corresponds to the second access category (i.e., AC_VI) having a priority level that is lower than the first access category.

Additionally, the third bit (B2) may correspond to the third access category (i.e., AC_BE) having priority level that is lower than the second access category. Furthermore, it will be assumed that the fourth bit (B3) corresponds to the fourth access category (i.e., AC_BK) having the lowest priority level. Finally, it will be assumed that the first to fourth bits (B0-B3) of the first sub-field (1810) will be respectively expressed as <b1, b2, b3, b4>.

As a first case, a case where one access category to which the buffer status is to be reported exists will be described. In the first case, among the first to fourth bits (B0-B3) of the first sub-field (1810), only 1 bit is set to '1'.

For example, the first to fourth bits (B0-B3) of the first sub-field (1810) may be respectively configured as <1, 0, 0, 0>. In this case, since the first bit (B0) is set to '1', the buffer status of the first access category (i.e., AC_VO) having the highest priority level may be reported to the AP. The traffic identifier (TID) related to the traffic being buffered to the first access category (i.e., AC_VO) may correspond to '6' or '7'.

In case the value set to the second sub-field (1820) is equal to '0', the second sub-field (1820) may indicate that the number of traffic identifiers (TIDs) related to the traffic buffered to the first access category (i.e., AC_VO) of the receiving STA is equal to 1. In this case, the traffic identifier (TID) for the traffic being buffered by the receiving STA may correspond to '6' or '7'.

In case the value set to the second sub-field (1820) is equal to '1', the second sub-field (1820) may indicate that the number of traffic identifiers (TIDs) related to the traffic buffered to the first access category (i.e., AC_VO) of the receiving STA is equal to 2. In case the value set to the second sub-field (1820) is equal to '2' or '3', the corresponding values may be understood as being Not Applicable.

As a second case, a case where two access categories to which the buffer status is to be reported exist will be described. In the second case, among the first to fourth bits (B0-B3) of the first sub-field (1810), 2 bits are set to '1'.

For example, the first to fourth bits (B0-B3) of the first sub-field (1810) may be respectively configured as <1, 1, 0, 0>. In this case, since the first bit (B0) and the second bit (B1) are set to '1', the buffer status of the first and second access categories (i.e., AC_VO, AC_VI) may be reported to the AP.

The traffic identifier (TID) related to the traffic being buffered to the first access category (i.e., AC_VO) may correspond to '6' or '7'. The traffic identifier (TID) related to the traffic being buffered to the second access category (i.e., AC_VI) may correspond to '4' or '5'.

In case the value set to the second sub-field (1820) is equal to '0', the second sub-field (1820) may indicate that the number of traffic identifiers (TIDs) related to the traffic buffered to the first and second access categories (i.e., AC_VO, AC_VI) of the receiving STA is equal to 2.

In this case, buffered traffic having two types of traffic identifiers (TIDs) (i.e., 6 and 7) may exist only in the first access category (i.e., AC_VO) of the receiving STA. Alternatively, buffered traffic having two types of traffic identifiers (TIDs) (i.e., 4 and 5) may exist only in the second access category (i.e., AC_VI) of the receiving STA.

Alternatively, buffered traffic having one type of traffic identifier (TID) (i.e., '6' or '7') may exist in the first access category (i.e., AC_VO) of the receiving STA, and buffered traffic having one type of traffic identifier (TID) (i.e., '4' or '5') may exist in the second access category (i.e., AC_VI) of the receiving STA.

In case the value set to the second sub-field (1820) is equal to '1', the second sub-field (1820) may indicate that the number of traffic identifiers (TIDs) related to all traffic being buffered to the first and second access categories (i.e., AC_VO, AC_VI) of the receiving STA is equal to 3.

In case the value set to the second sub-field (1820) is equal to '2', the second sub-field (1820) may indicate that the number of traffic identifiers (TIDs) related to all traffic being buffered to the first and second access categories (i.e., AC_VO, AC_VI) of the receiving STA is equal to 4.

In case the value set to the second sub-field (1820) is equal to '3', the corresponding values may be understood as being Not Applicable.

As a third case, a case where three access categories to which the buffer status is to be reported exist will be described. In the third case, among the first to fourth bits (B0-B3) of the first sub-field (1810), 3 bits are set to '1'.

For example, the first to fourth bits (B0-B3) of the first sub-field (1810) may be respectively configured as <1, 1, 1, 0>. In this case, since the first bit (B0) to the third bit (B0, B1, B2) are set to '1', the buffer status of the first to third access categories (i.e., AC_VO, AC_VI, AC_BE) may be reported to the AP.

The traffic identifier (TID) related to the traffic being buffered to the first access category (i.e., AC_VO) may correspond to '6' or '7'. The traffic identifier (TID) related to the traffic being buffered to the second access category (i.e., AC_VI) may correspond to '4' or '5'. And, the traffic identifier (TID) related to the traffic being buffered to the third access category (i.e., AC_BE) may correspond to '0' or '3'.

In case the value set to the second sub-field (1820) is equal to '0', the second sub-field (1820) may indicate that the number of traffic identifiers (TIDs) related to all traffic being buffered to the first to third access categories (i.e., AC_VO, AC_VI, AC_BE) of the receiving STA is equal to 3.

In case the value set to the second sub-field (1820) is equal to '1', the second sub-field (1820) may indicate that the number of traffic identifiers (TIDs) related to all traffic being buffered to the first to third access categories (i.e., AC_VO, AC_VI, AC_BE) of the receiving STA is equal to 4.

In case the value set to the second sub-field (1820) is equal to '2', the second sub-field (1820) may indicate that the number of traffic identifiers (TIDs) related to all traffic being buffered to the first to third access categories (i.e., AC_VO, AC_VI, AC_BE) of the receiving STA is equal to 5.

In case the value set to the second sub-field (1820) is equal to '3', the second sub-field (1820) may indicate that the number of traffic identifiers (TIDs) related to all traffic being buffered to the first to third access categories (i.e., AC_VO, AC_VI, AC_BE) of the receiving STA is equal to 6.

As a fourth case, a case where four access categories to which the buffer status is to be reported exist will be described. In the fourth case, among the first to fourth bits (B0-B3) of the first sub-field (1810), all bits are set to '1'.

For example, the first to fourth bits (B0-B3) of the first sub-field (1810) may be respectively configured as <1, 1, 1, 1>. In this case, since the first bit (B0) to the fourth bit (B0, B1, B2, B3) are set to '1', the buffer status of the first to fourth access categories (i.e., AC_VO, AC_VI, AC_BE, AC_BK) may be reported to the AP.

The traffic identifier (TID) related to the traffic being buffered to the first access category (i.e., AC_VO) may correspond to '6' or '7'. And, the traffic identifier (TID) related to the traffic being buffered to the second access category (i.e., AC_VI) may correspond to '4' or '5'.

The traffic identifier (TID) related to the traffic being buffered to the third access category (i.e., AC_BE) may correspond to '0' or '3'. And, the traffic identifier (TID) related to the traffic being buffered to the fourth access category (i.e., AC_BK) may correspond to '1' or '2'.

In case the value set to the second sub-field (1820) is equal to '0', the second sub-field (1820) may indicate that the number of traffic identifiers (TIDs) related to all traffic being buffered to the first to fourth access categories (i.e., AC_VO, AC_VI, AC_BE, AC_BK) of the receiving STA is equal to 4.

In case the value set to the second sub-field (1820) is equal to '1', the second sub-field (1820) may indicate that the number of traffic identifiers (TIDs) related to all traffic being buffered to the first to fourth access categories (i.e., AC_VO, AC_VI, AC_BE, AC_BK) of the receiving STA is equal to 5.

In case the value set to the second sub-field (1820) is equal to '2', the second sub-field (1820) may indicate that the number of traffic identifiers (TIDs) related to all traffic being buffered to the first to fourth access categories (i.e., AC_VO, AC_VI, AC_BE, AC_BK) of the receiving STA is equal to 6.

In case the value set to the second sub-field (1820) is equal to '3', the second sub-field (1820) may indicate that the number of traffic identifiers (TIDs) related to all traffic being buffered to the first to fourth access categories (i.e., AC_VO, AC_VI, AC_BE, AC_BK) of the receiving STA is equal to 7.

As a fifth case, a case where no access category to which the buffer status is to be reported exists will be described. In the fifth case, among the first to fourth bits (B0-B3) of the first sub-field (1810), all bits are set to '0'.

For example, the first to fourth bits (B0-B3) of the first sub-field (1810) may be respectively configured as <0, 0, 0, 0>.

In case the first bit (B0) to the fourth bit (B0, B1, B2, B3) are all set to '0', and in case the value set to the second sub-field (1820) is equal to '3', that the number of traffic identifiers (TIDs) related to all traffic being buffered to the first to fourth access categories (i.e., AC_VO, AC_VI, AC_BE, AC_BK) of the receiving STA is equal to 8.

In case the first bit (B0) to the fourth bit (B0, B1, B2, B3) are all set to '0', and in case the value set to the second sub-field (1820) is equal to '1' or '2', the corresponding values may be understood as being Not Applicable.

FIG. 18 describes a process for indicating a number of traffic identifiers (TIDs) related to the buffered traffic by using the first sub-field (1810), which is configured of 4 bits, and the second sub-field (1820), which is configured of 2 bits. However, this specification will not be limited only to the exemplary embodiment presented herein. And, accordingly, by using an 8-bit access category indication (ACI) bitmap, information on whether or not the buffer status related to 8 types of traffic identifiers (TIDs) are being signaled to the AP may also be signaled.

The third sub-field (1830) is configured of a seventh bit to an eighth bit (B6-B7) and may be referred to as an access category indication (ACI) High field. For example, the third sub-field (1830) may indicate a traffic identifier (TID) corresponding a traffic having the highest transmission priority level among the traffic being buffered by the receiving STA.

The fourth sub-field (1840) is configured of a ninth bit to a tenth bit (B8-B9) and may be referred to as a Scaling Factor (hereinafter referred to as 'SF') field. In order to report the buffer status, the fourth sub-field (1840) may indicate units that are pre-configured in the AP and the STA.

For example, in case the value indicated by the fourth sub-field (1840) is equal to '0', the scale factor (SF) may be equal to '16'. In case the value indicated by the fourth sub-field (1840) is equal to '1', the scale factor (SF) may be equal to '128'. In case the value indicated by the fourth sub-field (1840) is equal to '3', the scale factor (SF) may be equal to '2048'. And, in case the value indicated by the fourth sub-field (1840) is equal to '4', the scale factor (SF) may be equal to '16,384'.

The fifth sub-field (1850) is configured of an eleventh bit to an eighteenth bit (B10-B17) and may be referred to as a Queue Size High field. According to this exemplary embodiment, the fifth sub-field (1850) may indicate queue size information corresponding to the traffic identifier (TID) being indicated by the third sub-field (1830). Additionally, the queue size information of the fifth sub-field (1850) may be expressed based on units according to the scale factor (SF) being set to the fourth sub-field (1840).

The sixth sub-field (1860) is configured of a nineteenth bit to a twenty-fifth bit (B18-B25) and may be referred to as a Queue Size All field. According to this exemplary embodiment, the sixth sub-field (1860) may indicate queue size information corresponding to all traffic being buffered by the receiving STA. Additionally, the queue size information of the sixth sub-field (1860) may be expressed based on units according to the scale factor (SF) being set to the fourth sub-field (1840).

For a more detailed understanding of the control information sub-field for the buffer status report according to the exemplary embodiment of this specification, reference may be made to Section 9.2.4.6.4.5 of the standard document IEEE P802.11ax/D1.0, which was disclosed in November, 2016.

According to the exemplary embodiment of this specification, by using a difference value between the first sub-field (1810) and the second sub-field (1820) for the buffer status report, all of the 8 different cases of the traffic identifier (TID) may be expressed by using only 2 bits being assigned to the second sub-field (1820).

According to the exemplary embodiment of this specification, the overhead of the AP may be reduced, and efficient adjustment of uplink scheduling may be achieved. Accordingly, a wireless LAN system having an enhanced performance may be provided.

Figure 19:
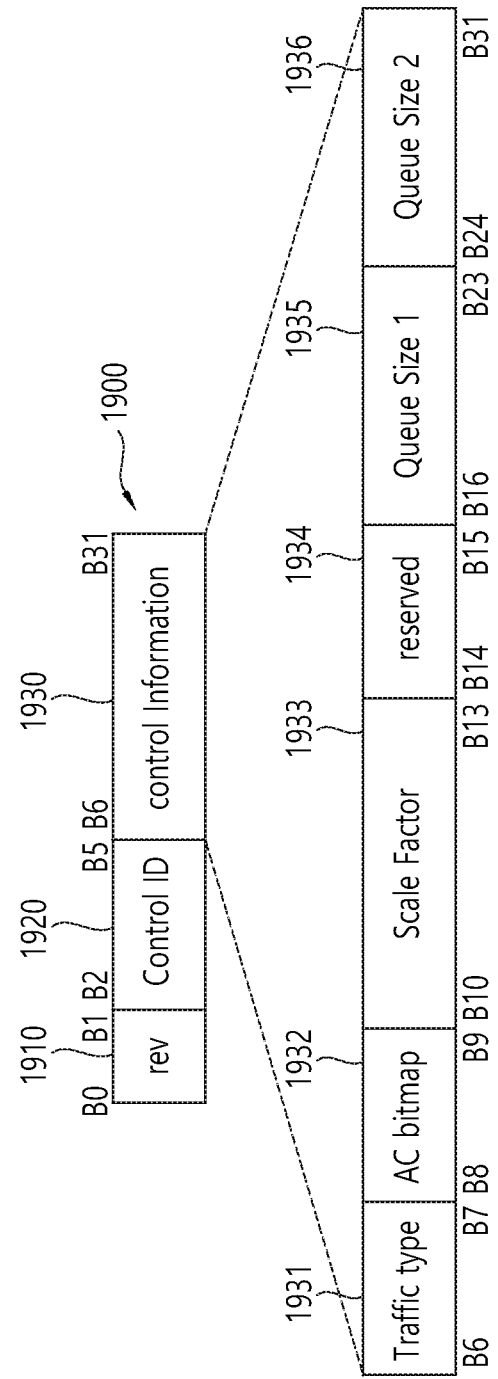
FIG. 19 is a diagram showing a field region of a buffer status report frame according to another exemplary embodiment of this specification.

FIG. 19 is a diagram showing a field region of a buffer status report frame according to another exemplary embodiment of this specification.

Referring to FIG. 1 to FIG. 19, according to the other exemplary embodiment of this specification, if the first and the second bits (1910) (B0-B1) of a HT control field (1900 or 1619 of FIG. 16) are set to '11', the remaining bits (B2-B31) of the HT control field (1900) may be assigned for an A-Control field (1920 and 1930, or 1710 of FIG. 17).

A-Control ID field (1920) (B2-B5) may indicate a type of the information being included in the control information field (1930). The control information field (1930) that is related to the value of the control ID field (1920) may be defined as shown below in Table 5.

TABLE 5

| Control ID value | Meaning | Length of the Control Information subfield (bits) |
| --- | --- | --- |
| 0 | UL MU response scheduling | 26 |
| 1 | Operating Mode | 12 |
| 2 | HE link adaptation | 16 |
| 3 | Buffer Status Report (BSR) | 26 |
| 4 | UL Power Headroom | 8 |
| 5 | Bandwidth Query Report (BQR) | 10 |
| 6-15 | Reserved | — |

Referring to Table 5, when the control ID field (1920) is set to '1', the control information field (1930) may indicate information for requesting a change (or shift) in the operating mode of the STA transmitting a frame by using 12 bits.

When the control ID field (1920) (B2-B5) is set to '3', the control information field may indicate information for the buffer status report (BSR) of the STA transmitting a frame by using 26 bits.

Hereinafter, in this specification, it will be assumed that the control ID field (1920) for the buffer status report is set to '3'.

The control information field (1930) may include first to sixth sub-fields (1931~1936). The control information field (1930) will hereinafter be described in more detail with reference to the accompanying drawings.

FIG. 20 is a diagram for describing a plurality of sub-fields of a control information field according to another exemplary embodiment of this specification.

Referring to FIG. 19 and FIG. 20, a traffic type field (2010) of FIG. 20 may be configured of 2 bits (B6-B7) and may correspond to the first sub-field (1931) of FIG. 19. The traffic type field (2010) may indicate traffic urgency such as delay-sensitive (DS) traffic or delay-tolerant (DT) traffic.

For example, if the 2-bit (B6-B7) traffic type field (2010) is set to '01', this may indicate a delay-tolerant (DT) traffic. In this case, the delay-tolerant (DT) traffic may correspond to traffic being associated with the AC_BK type or the AC_BE type.

For example, if the 2-bit (B6-B7) traffic type field (2010) is set to '10', this may indicate a delay-sensitive (DS) traffic. In this case, the delay-sensitive (DS) traffic may correspond to traffic being associated with the AC_VI type or the AC_VO type.

For example, if the 2-bit (B6-B7) traffic type field (2010) is set to '11', this may indicate both the delay-tolerant (DT) traffic and the delay-sensitive (DS) traffic. In this case, the queue size information, which will be described later on in more detail, may be respectively indicated as a total sum of the delay-tolerant (DT) traffic and a total sum of the delay-sensitive (DS) traffic.

For example, if the 2-bit (B6-B7) traffic type field (2010) is set to '00', the remaining region of the control information field (B8-B31) may correspond to a reserved region.

Alternatively, although it is not shown in FIG. 20, in case the traffic type field (2010) is set to '00', the remaining region of the control information field may be used for announcing (or notifying) a buffer status wherein all of the frames being related to all types of traffic identifiers (TIDs) (0-7) are aggregated.

An AC bitmap field (2020) of FIG. 20 may be configured of 2 bits (B8-B9) and may correspond to the second sub-field (1932) of FIG. 19.

The AC bitmap field (2020) may be associated with the traffic type field (2010) and may indicate an access category (AC) bitmap.

More specifically, when the delay-tolerant (DT) traffic is indicated by the traffic type field (2010), the AC bitmap field (2020) may indicate the presence of the AC_BE type and AC_BK type traffic.

For example, when the 2-bit (B8-B9) AC bitmap field (2020) is set to '01', the presence of the AC_BK type traffic may be indicated. When the 2-bit (B8-B9) AC bitmap field (2020) is set to '10', the presence of the AC_BE type traffic may be indicated. And, when the 2-bit (B8-B9) AC bitmap field (2020) is set to '11', the presence of both the AC_BK type traffic and the AC_BE type traffic may be indicated.

More specifically, when the delay-sensitive (DS) traffic is indicated by the traffic type field (2010), the AC bitmap field (2020) may indicate the presence of the AC_VO type and AC_VI type traffic.

For example, when the 2-bit (B8-B9) AC bitmap field (2020) is set to '01', the presence of the AC_VI type traffic may be indicated. When the 2-bit (B8-B9) AC bitmap field (2020) is set to '10', the presence of the AC_VO type traffic may be indicated. And, when the 2-bit (B8-B9) AC bitmap field (2020) is set to '11', the presence of both the AC_VI type traffic and the AC_VO type traffic may be indicated.

More specifically, when both the delay-sensitive (DS) traffic and the delay-tolerant (DT) traffic are indicated by the traffic type field (2010), the AC bitmap field (2020) may correspond to a reserved region.

The scale factor field (2030) of FIG. 20 is configured of 4 bits (B10-B13) and may correspond to the third sub-field (1933) of FIG. 19. The scale factor field (2030) may be associated with the traffic type field (2010) and the AC bitmap field (2020), and the scale factor field (2030) may include scaling information for indicating a queue size of the buffered traffic (i.e., the size of the buffered traffic).

The reserved field (2040) of FIG. 20 is configured of 2 bits (B14-B15) and may correspond to the fourth sub-field (1934) of FIG. 19.

The queue size field (2050) of FIG. 20 is configured of 16 bits (B16-B31) and may correspond to the fifth and sixth third sub-fields (1935, 1936) of FIG. 19. The queue size field (2050) of FIG. 20 may indicate the queue size of the traffic being buffered to the STA based on the traffic type field (2010), the AC bitmap field (2020), and the scale factor field (2030).

For example, when the traffic type field (2010) is indicated as '10', and when the AC bitmap field (2020) is indicated as '10', among the 4 bits (B10-B13) of the scale factor field (2030), 2 bits (B11-B12) may be set to have a valid value. The 8 bits (B16-B23) of the queue size field (2050) may indicate a total size of the traffic being buffered to the AC_VO type transmission queue of the STA based on the valid value of the scale factor field (2030).

As another example, when the traffic type field (2010) is indicated as '01', and when the AC bitmap field (2020) is indicated as '11', 2 bits (B10-B11) and 2 bits (B12-B13) of the scale factor field (2030) may each be set to have a valid value. The 8 bits (B16-B23) of the queue size field (2050) may indicate a total size of the traffic being buffered to the AC_BE type transmission queue of the STA in accordance with the value set to the 2 bits (B10-B11) of the scale factor field (2030).

Additionally, the 8 bits (B24-B31) of the queue size field (2050) may indicate a total size of the traffic being buffered to the AC_BK type transmission queue of the STA in accordance with the value set to the 2 bits (B12-B13) of the scale factor field (2030).

As yet another example, when the traffic type field (2010) is indicated as '10', and when the AC bitmap field (2020) is indicated as '11', 2 bits (B10-B11) and 2 bits (B12-B13) of the scale factor field (2030) may each be set to have a valid value. The 8 bits (B16-B23) of the queue size field (2050) may indicate a total size of the traffic being buffered to the AC_VO type transmission queue of the STA in accordance with the value set to the 2 bits (B10-B11) of the scale factor field (2030).

Additionally, the 8 bits (B24-B31) of the queue size field (2050) may indicate a total size of the traffic being buffered to the AC_VI type transmission queue of the STA in accordance with the value set to the 2 bits (B12-B13) of the scale factor field (2030).

As an additional example, when the traffic type field (2010) is indicated as '11', 2 bits (B10-B11) and 2 bits (B12-B13) of the scale factor field (2030) may each be set to have a valid value.

The 8 bits (B16-B23) of the queue size field (2050) may indicate a total size of the traffic being associated with the delay-sensitive (DS) traffic of the STA according to the value set to the 2 bits (B10-B11) of the scale factor field (2030). In this case, the delay-sensitive (DS) traffic may include traffic being buffered to the AC_VO type transmission queue and traffic being buffered to the AC_VI type transmission queue.

The 8 bits (B24-B31) of the queue size field (2050) may indicate a total size of the traffic being associated with the delay-tolerant (DT) traffic of the STA according to the value set to the 2 bits (B12-B13) of the scale factor field (2030). In this case, the delay-tolerant (DT) traffic may include traffic being buffered to the AC_BK type transmission queue and traffic being buffered to the AC_BE type transmission queue.

Figure 21:
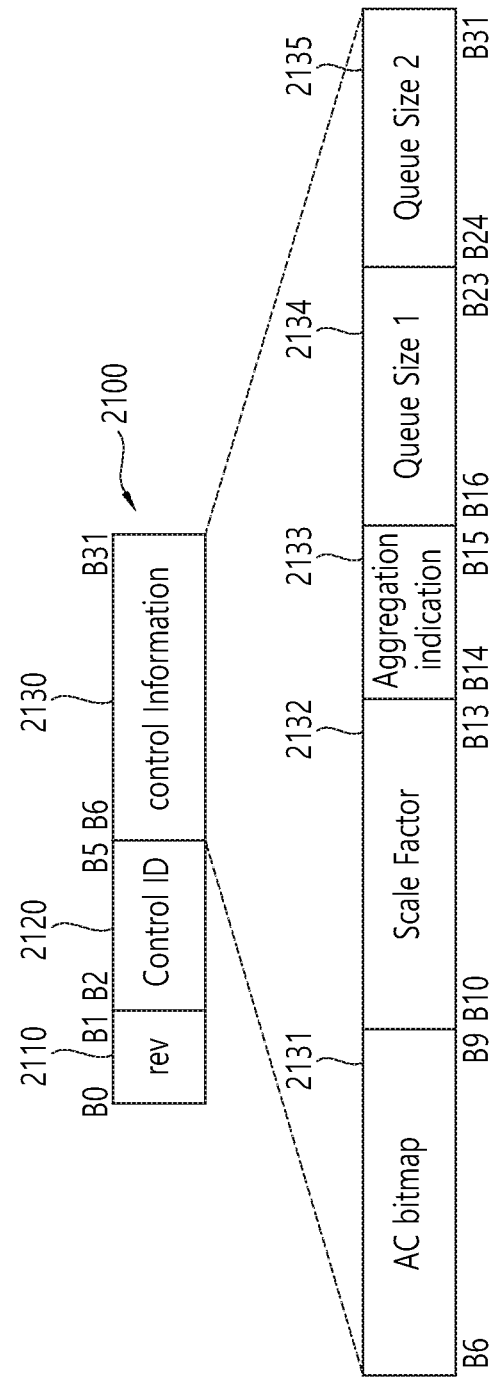
FIG. 21 is a diagram showing a field region of a buffer status report frame according to yet another exemplary embodiment of this specification.

FIG. 21 is a diagram showing a field region of a buffer status report frame according to yet another exemplary embodiment of this specification.

Referring to FIG. 1 to FIG. 21, according to yet another exemplary embodiment of this specification, if the first and the second bits (2110) (B0-B1) of a HT control field (2100 or 1619 of FIG. 16) are set to '11', the remaining bits (B2-B31) of the HT control field (2100) may be assigned for an A-Control field (2120 and 2130, or 1710 of FIG. 17).

As described above, in FIG. 21, it will be assumed that the control ID field (1920) for the buffer status report is set to '3'. Accordingly, the control information field (2130) may indicate information for the buffer status report (BSR) of the STA transmitting a frame by using 26 bits.

The control information field (2130) may include a plurality of sub-fields (2131~2135). The buffer status report frame of FIG. 21 may bot include the traffic type field (1931 of FIG. 19).

The AC bitmap field (2131) may be assigned with 4 bits (B6-B9). Accordingly, the presence of the traffic being buffered for all 4 types of ACs may be indicated based on the AC bitmap field (2131).

The scale factor field (2132) may be assigned with 4 bits (B10-B13). The scale factor field (2132) may be associated with the traffic type field (2210), and scaling information for indicating the queue size of the buffered traffic may be included in the scale factor field (2132).

An aggregation indicator (hereinafter referred to as 'A-Indicator') field (2133) may be assigned with 2 bits (B14-B15). The scale factor field (2132) may be associated with the traffic type field (2110).

The aggregation indicator field (2133) may indicate whether the information indicating the queue size of the buffered traffic is related to the queue size of a single traffic or the queue size of an aggregated traffic.

A first queue size field may indicate the queue size of the traffic being buffered to the STA based on the AC bitmap field (2131), 2 bits (B10-B11) of the scale factor field (2132), and 1 bit (B14) of the aggregation indicator field (2133).

A second queue size field may indicate the queue size of the traffic being buffered to the STA based on the AC bitmap field (2131), 2 bits (B12-B13) of the scale factor field (2132), and 1 bit (B15) of the aggregation indicator field (2133). An exemplary embodiment of the indication of the queue size of the buffered traffic will hereinafter be described in more detail with reference to the accompanying drawing.

FIG. 22 is a diagram for describing a plurality of sub-fields according to yet another exemplary embodiment of this specification.

Referring to FIG. 21 and FIG. 22, the AC bitmap field (2210) may be configured of 4 bits (B6-B9) and may correspond to the first sub-field (2131) of FIG. 21.

For example, each of the sixth to seventh bits (B6-B7) of the AC bitmap field (2210) may be respectively associated with the AC_VO type traffic and the AC_VI type traffic. And, each of the eighth to ninth bits (B8-B9) of the AC bitmap field (2210) may be respectively associated with the AC_BE type traffic and the AC_BK type traffic.

The scale factor field (2220) may be configured of 4 bits (B10-B13) and may correspond to the second sub-field (2132) of FIG. 21.

For example, each of the tenth to eleventh bits (B10-B11) of the scale factor field (2220) may respectively include scaling information (SF1) for the AC_VO type traffic and the AC_VI type traffic. And, each of the twelfth to thirteenth bits (B12-B13) of the scale factor field (2220) may respectively include scaling information (SF2) for the AC_BE type traffic and the AC_BK type traffic.

The aggregation indicator field (2230) may be configured of 2 bits (B14-B15) and may correspond to the third sub-field (2133) of FIG. 21.

More specifically, the fourteenth bit (B14) of the aggregation indicator field (2230) may indicate whether or not a queue size in which the AC_VO type traffic and the AC_VI type traffic are aggregated is being reported.

For example, among the sixth to seventh bits (B6-B7) of the AC bitmap field (2210), if one bit is set to '1', the aggregation indicator field (2230) may be set to '0'. This may represent that the queue size information of a single traffic is indicated in the first queue size field (2240), which follows the aggregation indicator field (2230).

As another example, among the sixth to seventh bits (B6-B7) of the AC bitmap field (2210), if all bits are set to '1', the aggregation indicator field (2230) may be set to '1'. This may represent that the queue size information (V1) of an aggregated traffic is indicated in the first queue size field (2240) (B16-B23), which follows the aggregation indicator field (2230). In this case, the queue size information (V1) of the aggregated traffic may represent information indicating a sum of the queue size of the AC_VO type traffic and the queue size of the AC_VI type traffic.

As yet another example, among the eighth to ninth bits (B8-B9) of the AC bitmap field (2210), if all bits are set to '1', the aggregation indicator field (2230) may be set to '1'. This may represent that the queue size information (V2) of an aggregated traffic is indicated in the second queue size field (2250) (B24-B31), which follows the aggregation indicator field (2230). In this case, the queue size information (V2) of the aggregated traffic may represent information indicating a sum of the queue size of the AC_BE type traffic and the queue size of the AC_BK type traffic.

Although it is not shown in FIG. 22, the STA and the AP according to yet another exemplary embodiment of this specification may determine, without including the aggregation indicator field (2230), whether or not the values set to the first and second queue size fields (2240, 2250) according to a pre-configured rule based on the AC bitmap field (2210) correspond to values associated with aggregation.

For example, in case both the sixth to seventh bits (B6-B7) of the AC bitmap field (2210) are set to '11', the STA and the AP may implicitly determine that the value set to the first queue size field (2240) corresponds to information indicating a sum of the queue size of the AC_VO type traffic and the queue size of the AC_VI type traffic.

As another example, in case both the eighth to ninth bits (B8-B9) of the AC bitmap field (2210) are set to '11', the STA and the AP may implicitly determine that the value set to the first queue size field (2240) corresponds to information indicating a sum of the queue size of the AC_BE type traffic and the queue size of the AC_BK type traffic.

Additionally, as another method for the buffer status report, the queue size information of a traffic being associated with one traffic identifier (TID) may be signaled to the AP by using the above-described QoS control field (1618) shown in FIG. 16. By additionally inserting the remaining bit (B2-B31) part of the existing HT control field (2100), the queue size information of the traffic being associated with the remaining traffic identifiers (TIDs) may be signaled to the AP.

FIG. 23 is a conceptual diagram for describing a plurality of sub-fields for buffer status report of all access categories according to another exemplary embodiment of this specification.

Referring to FIG. 21 to FIG. 23, for the buffer status report for all access categories (AC_VO, AC_VI, AC_BE, AC_BK), the queue size information related to any one of the access categories (AC_VO, AC_VI, AC_BE, AC_BK) may be transmitted to the AP through the above-described QoS control field (1618 of FIG. 16).

Additionally, information on the remaining 3 access categories may be transmitted to the AP by using the HT control field (2100). As described above, the control information field (2130 of FIG. 21) may be configured of 26 bits (B6-B31 of FIG. 21).

Referring to FIG. 23, a Queue size indication field (2310) may be configured of 2 bits (B6-B7). Herein, the value that is indicated by the Queue size indication field (2310) may be pre-configured to the AP and the STA.

Accordingly, the queue size information corresponding to each of the 3 access categories may correspond to 8-bit units (B8-B15, B16-B23, B24-B31), which may be transmitted to the AP by using the remaining 24 bits (B8-B31 of FIG. 21) of the control information field (2130 of FIG. 21).

The Queue size indication field (2310) of FIG. 23 may indicate the access category for which the value set to the first to third subsequent 8-bit unit bits (B8-B15, B16-B23, B24-B31) is intended.

For example, if 2 bits (B6-B7) corresponding to the value '1' are set to '00' in the Queue size indication field (2310), the first to third subsequent bits (B8-B15, B16-B23, B24-B31) may be sequentially assigned with the queue size information corresponding to the AC_VO transmission queue, the AC_VI transmission queue, and the AC_BE transmission queue.

In this case, the queue size information corresponding to the AC_BK transmission queue may be indicated by the QoS control field.

For example, if 2 bits (B6-B7) corresponding to the value '2' are set to '01' in the Queue size indication field (2310), the first to third subsequent bits (B8-B15, B16-B23, B24-B31) may be sequentially assigned with the queue size information corresponding to the AC_VO transmission queue, the AC_VI transmission queue, and the AC_BK transmission queue.

In this case, the queue size information corresponding to the AC_BE transmission queue may be indicated by the QoS control field.

For example, if 2 bits (B6-B7) corresponding to the value '3' are set to '10' in the Queue size indication field (2310), the first to third subsequent 8-bit units (B8-B15, B16-B23, B24-B31) may be sequentially assigned with the queue size information corresponding to the AC_VO transmission queue, the AC_BE transmission queue, and the AC_BK transmission queue.

In this case, the queue size information corresponding to the AC_VI transmission queue may be indicated by the QoS control field.

For example, if 2 bits (B6-B7) corresponding to the value '4' are set to '11' in the Queue size indication field (2310), the first to third subsequent 8-bit units (B8-B15, B16-B23, B24-B31) may be sequentially assigned with the queue size information corresponding to the AC_VI transmission queue, the AC_BE transmission queue, and the AC_BK transmission queue.

In this case, the queue size information corresponding to the AC_VO transmission queue may be indicated by the QoS control field.

According to the exemplary embodiment shown in FIG. 23, the queue size information may be signaled to the AP based on the AC. Therefore, an aggregated value of the traffic size related to two different types of traffic identifiers (TIDs) that can be included in each AC may be signaled to the AP.

Although it is not shown in FIG. 23, each of the first to third subsequent bits (B8-B15, B16-B23, B24-B31) may include a 1-bit scale factor.

For example, among the first subsequent bits (B8-B15), 7 bits (B8-B14) may be assigned for the queue size, and 1 bit (B15) may be assigned for a Scale Factor (hereinafter referred to as SF). Among the second subsequent bits (B16-B23), 7 bits (B16-B22) may be assigned for the queue size, and 1 bit (B23) may be assigned for a Scale Factor (SF). Among the third subsequent bits (B24-B31), 7 bits (B24-B30) may be assigned for the queue size, and 1 bit (B31) may be assigned for a Scale Factor (SF). in this case, in case the scale factor (SF) is not specified, the STA and the AP may determine the queue size information based on the pre-configured value (e.g., 256 bytes).

In case the scale factor (SF) is set to '0' (a short SF), the STA and the AP may determine the queue size information based on the value according to the scale factor (SF) (e.g., 16 bytes or 32 bytes).

In case the scale factor (SF) is set to '1' (a long SF), the STA and the AP may determine the queue size information based on the value according to the scale factor (SF) (e.g., 512 bytes or 1024 bytes).

Figure 24:
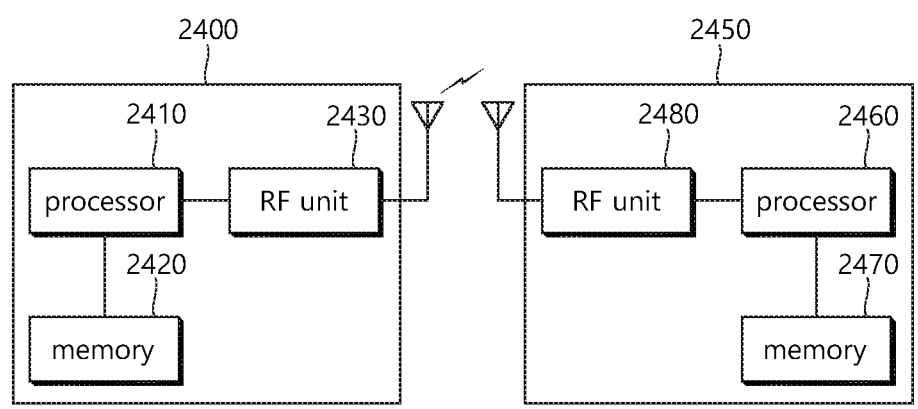
FIG. 24 is a block view illustrating a wireless device to which the exemplary embodiment of the present invention can be applied.

FIG. 24 is a block view illustrating a wireless device to which the exemplary embodiment of the present invention can be applied.

Referring to FIG. 24, as an STA that can implement the above-described exemplary embodiment, the wireless device may correspond to an AP or a non-AP station (STA). The wireless device may correspond to the above-described user or may correspond to a transmitting device transmitting a signal to the user.

The AP (2400) includes a processor (2410), a memory (2420), and a radio frequency (RF) unit (2430).

The RF unit (2430) is connected to the processor (2410), thereby being capable of transmitting and/or receiving radio signals.

The processor (2410) implements the functions, processes, and/or methods proposed in the present invention. For example, the processor (2410) may be implemented to perform the operations according to the above-described exemplary embodiments of the present invention. More specifically, among the operations that are disclosed in the exemplary embodiments of FIG. 1 to FIG. 23, the processor (2410) may perform the operations that may be performed by the AP.

The non-AP STA (2450) includes a processor (2460), a memory (2470), and a radio frequency (RF) unit (2480).

The RF unit (2480) is connected to the processor (2460), thereby being capable of transmitting and/or receiving radio signals.

The processor (2460) implements the functions, processes, and/or methods proposed in the present invention. For example, the processor (2460) may be implemented to perform the operations of the non-AP STA according to the above-described exemplary embodiments of the present invention. The processor may perform the operations of the non-AP STA, which are disclosed in the exemplary embodiments of FIG. 1 to FIG. 23.

The processor (2410 and 2460) may include an application-specific integrated circuit (ASIC), another chip set, a logical circuit, a data processing device, and/or a converter converting a baseband signal and a radio signal to and from one another. The memory (2420 and 2470) may include a read-only memory (ROM), a random access memory (RAM), a flash memory, a memory card, a storage medium, and/or another storage device. The RF unit (2430 and 2480) may include one or more antennas transmitting and/or receiving radio signals.

When the exemplary embodiment is implemented as software, the above-described method may be implemented as a module (process, function, and so on) performing the above-described functions. The module may be stored in the memory (2420 and 2470) and may be executed by the processor (2410 and 2460). The memory (2420 and 2470) may be located inside or outside of the processor (2410 and 2460) and may be connected to the processor (2410 and 2460) through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method in a wireless local area network (WLAN) system, the method performed by an access point (AP) and comprising:
  receiving a buffer status report (BSR) frame from a receiving station (STA) being associated with the AP,
    wherein the BSR frame includes an access category (AC) bitmap field for at least one AC and an identifier (ID) field for at least one traffic identifier (TID),
    wherein the at least one TID is related to a transmission priority level of traffic buffered by the receiving STA,
    wherein the AC bitmap field has an AC bitmap value related to a number of ACs for which a buffer status of the receiving STA is to be reported,
    wherein the ID field has an ID value related to a number of TIDs for which the buffer status of the receiving STA is to be reported, and
    wherein the ID value is set based on subtracting the number of TIDs by the AC bitmap value; and
  transmitting a trigger frame for multiple user STAs participating in an uplink Multi-user (UL MU) transmission based on the BSR frame.

2. The method of claim 1, wherein the buffer status includes information related to a traffic size buffered in the receiving STA.

3. The method of claim 1,
wherein the AC bitmap field has a length of 4 bits and includes first to fourth bits, and
wherein the first bit of the AC bitmap field is related to a first AC having a highest priority level, the second bit of the AC bitmap field is related to a second AC having a lowest priority level, the third bit of the AC bitmap field is related to a third AC having a priority level lower than the first AC, and the fourth bit of the AC bitmap field is related to a fourth AC having a priority level lower than the third AC.

4. The method of claim 3, wherein the first bit of the AC bitmap has a value '1' when the BSR reports traffic related to the first AC, the second bit of the AC bitmap has a value '1' when the BSR reports traffic related to the second AC, the third bit of the AC bitmap has a value '1' when the BSR reports traffic related to the third AC, and the fourth bit of the AC bitmap has a value '1' when the BSR reports traffic related to the fourth AC.

5. The method of claim 3, wherein all of the first to fourth bits of the AC bitmap field are set to '0' when the BSR reports traffic related to eight TIDs.

6. The method of claim 1, wherein the ID field has a length of 2 bits.

7. A wireless terminal in a wireless local area network (WLAN) system, the wireless terminal comprising:
a transceiver transceiving radio signals; and
a processor being operatively connected to the transceiver,
wherein the processor is configured:
to receive a buffer status report (BSR) frame from a receiving station (STA) being associated with the wireless terminal,
wherein the BSR frame includes an access category (AC) bitmap field for at least one AC and an identifier (ID) field for at least one traffic identifier (TID),
wherein the at least one TID is related to a transmission priority level of traffic buffered by the receiving STA,
wherein the AC bitmap field has an AC bitmap value related to a number of ACs for which a buffer status of the receiving STA is to be reported,
wherein the ID field has an ID value related to a number of TIDs for which the buffer status of the receiving STA is to be reported, and
wherein the ID value is set based on subtracting the number of TIDs by the AC bitmap value, and
to transmit a trigger frame for multiple user STAs participating in an uplink Multi-user (UL MU) transmission based on the BSR frame.

8. The wireless terminal of claim 7, wherein the AC bitmap field has a length of 4 bits and includes first to fourth bits, and wherein the first bit of the AC bitmap field is related to a first AC having a highest priority level, the second bit of the AC bitmap field is related to a second AC having a lowest priority level, the third bit of the AC bitmap field is related to a third AC having a priority level lower than the first AC, and the fourth bit of the AC bitmap field is related to a fourth AC having a priority level lower than the third AC.

9. The wireless terminal of claim 8, wherein the first bit of the AC bitmap has a value '1' when the BSR reports traffic related to the first AC, the second bit of the AC bitmap has a value '1' when the BSR reports traffic related to the second AC, the third bit of the AC bitmap has a value '1' when the BSR reports traffic related to the third AC, and the fourth bit of the AC bitmap has a value '1' when the BSR reports traffic related to the fourth AC.

10. The wireless terminal of claim 7, wherein the ID field has a length of 2 bits.

11. A method in a wireless local area network (WLAN) system, the method performed by a receiving station (STA) and comprising:
transmitting a buffer status report (BSR) frame to an access point (AP), wherein the BSR frame includes an access category (AC) bitmap field for at least one AC and an identifier (ID) field for at least one traffic identifier (TID), wherein the at least one TID is related to a transmission priority level of traffic buffered by the receiving STA, wherein the AC bitmap field has an AC bitmap value related to a number of ACs for which a buffer status of the receiving STA is to be reported, wherein the ID field has an ID value related to a number of TIDs for which the buffer status of the receiving STA is to be reported, and wherein the ID value is set based on subtracting the number of TIDs by the AC bitmap value; and
receiving a trigger frame soliciting an uplink Multi-user (UL MU) transmission, wherein the trigger frame is configured by the AP based on the BSR frame.

12. The method of claim 11, wherein the buffer status includes information related to a traffic size buffered in the receiving STA.

13. The method of claim 11, wherein the AC bitmap field has a length of 4 bits and includes first to fourth bits, and wherein the first bit of the AC bitmap field is related to a first AC having a highest priority level, the second bit of the AC bitmap field is related to a second AC having a lowest priority level, the third bit of the AC bitmap field is related to a third AC having a priority level lower than the first AC, and the fourth bit of the AC bitmap field is related to a fourth AC having a priority level lower than the third AC.

14. The method of claim 13, wherein the first bit of the AC bitmap has a value '1' when the BSR reports traffic related to the first AC, the second bit of the AC bitmap has a value '1' when the BSR reports traffic related to the second AC, the third bit of the AC bitmap has a value '1' when the BSR reports traffic related to the third AC, and the fourth bit of the AC bitmap has a value '1' when the BSR reports traffic related to the fourth AC.

15. The method of claim 13, wherein all of the first to fourth bits of the AC bitmap field are set to '0' when the BSR reports traffic related to eight TIDs.

16. The method of claim 11, wherein the ID field has a length of 2 bits.

17. A receiving station (STA) in a wireless local area network (WLAN) system, comprising:
a transceiver transceiving radio signals; and
a processor being operatively connected to the transceiver,
wherein the processor is configured:
to transmit, via the transceiver, a buffer status report (BSR) frame to an access point (AP), wherein the BSR frame includes an access category (AC) bitmap field for at least one AC and an identifier (ID) field for at least one traffic identifier (TID), wherein the at least one TID is related to a transmission priority level of traffic buffered by the receiving STA, wherein the AC bitmap field has an AC bitmap value related to a number of ACs for which a buffer status of the receiving STA is to be reported, wherein the ID field has an ID value related to a number of TIDs for which the buffer status of the receiving STA is to be reported, and wherein the ID value is set based on subtracting the number of TIDs by the AC bitmap value; and to receive, via the transceiver, a trigger frame soliciting an uplink Multi-user (UL MU) transmission, wherein the trigger frame is configured by the AP based on the BSR frame.

18. The receiving STA of claim 17, wherein the AC bitmap field has a length of 4 bits and includes first to fourth bits, and wherein the first bit of the AC bitmap field is related to a first AC having a highest priority level, the second bit of the AC bitmap field is related to a second AC having a lowest priority level, the third bit of the AC bitmap field is related to a third AC having a priority level lower than the first AC, and the fourth bit of the AC bitmap field is related to a fourth AC having a priority level lower than the third AC.

19. The receiving STA of claim 18, wherein the first bit of the AC bitmap has a value '1' when the BSR reports traffic related to the first AC, the second bit of the AC bitmap has a value '1' when the BSR reports traffic related to the second AC, the third bit of the AC bitmap has a value '1' when the BSR reports traffic related to the third AC, and the fourth bit of the AC bitmap has a value '1' when the BSR reports traffic related to the fourth AC.

20. The receiving STA of claim 18, wherein all of the first to fourth bits of the AC bitmap field are set to '0' when the BSR reports traffic related to eight TIDs.

21. The receiving STA of claim 17, wherein the ID field has a length of 2 bits.

\* \* \* \* \*